United States Patent
Xiang

(10) Patent No.: US 12,468,365 B2
(45) Date of Patent: Nov. 11, 2025

(54) CHARGING CONTROL METHOD, ELECTRONIC DEVICE, AND CHARGING CONTROL SYSTEM

(71) Applicant: Honor Device Co., Ltd., Shenzhen (CN)

(72) Inventor: Chao Xiang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 18/549,056

(22) PCT Filed: Aug. 24, 2022

(86) PCT No.: PCT/CN2022/114423
§ 371 (c)(1),
(2) Date: Sep. 5, 2023

(87) PCT Pub. No.: WO2023/045683
PCT Pub. Date: Mar. 30, 2023

(65) Prior Publication Data
US 2024/0152192 A1 May 9, 2024

(30) Foreign Application Priority Data
Sep. 26, 2021 (CN) .......................... 202111132066.2

(51) Int. Cl.
*H04L 1/12* (2006.01)
*G06F 1/26* (2006.01)
(Continued)

(52) U.S. Cl.
CPC ............... *G06F 1/266* (2013.01); *G06F 1/28* (2013.01); *G06F 1/3212* (2013.01);
(Continued)

(58) Field of Classification Search
CPC ...................................................... G06F 1/266
See application file for complete search history.

(56) References Cited

U.S. PATENT DOCUMENTS

| | | | |
|---|---|---|---|
| 8,824,136 B1 * | 9/2014 | Interian, III | G05G 9/08 |
| | | | D14/251 |
| 2003/0030412 A1 | 2/2003 | Matsuda et al. | |

(Continued)

FOREIGN PATENT DOCUMENTS

| | | |
|---|---|---|
| CN | 102411419 A | 4/2012 |
| CN | 203261052 U | 10/2013 |

(Continued)

*Primary Examiner* — Mohammed H Rehman
(74) *Attorney, Agent, or Firm* — Conley Rose, P.C.

(57) ABSTRACT

A charging control method, an electronic device, and a charging control system. According to the charging control method, when a first electronic device is in a power-off state, an embedded controller is controlled to be powered off. When a second USB port of a second electronic device is connected to a first USB port of the first electronic device, the embedded controller is woken up by using a first power supply signal that is input through the second USB port, the embedded controller obtains device information of the second electronic device, and then the embedded controller controls, based on the device information, a first battery of the first electronic device to charge the second electronic device. According to the method, the first electronic device can charge the second electronic device when being in the power-off state.

20 Claims, 18 Drawing Sheets

(51) Int. Cl.
*G06F 1/28* (2006.01)
*G06F 1/3212* (2019.01)
*G06F 1/3296* (2019.01)
*G06F 13/42* (2006.01)
*H02J 7/00* (2006.01)
*H04L 5/00* (2006.01)
*H04L 7/00* (2006.01)

(52) U.S. Cl.
CPC ........ *G06F 1/3296* (2013.01); *H02J 7/00034* (2020.01); *H02J 2207/30* (2020.01)

(56) References Cited

U.S. PATENT DOCUMENTS

| | | |
|---|---|---|
| 2006/0065743 A1 | 3/2006 | Fruhauf |
| 2008/0178011 A1 | 7/2008 | Hubo et al. |
| 2009/0100526 A1* | 4/2009 | Lee .................. G06F 21/83 |
| | | 726/26 |
| 2009/0161806 A1* | 6/2009 | Ananny .................. G04G 7/00 |
| | | 375/354 |
| 2010/0174926 A1* | 7/2010 | Huang .................. G06F 3/0227 |
| | | 713/300 |
| 2011/0161694 A1 | 6/2011 | Fujiwara |
| 2014/0143477 A1* | 5/2014 | Lin .......................... G06F 13/16 |
| | | 711/103 |
| 2014/0375433 A1* | 12/2014 | Lin .................... G06K 19/0723 |
| | | 340/10.34 |
| 2015/0121092 A1* | 4/2015 | Hung ........................ G06F 1/26 |
| | | 700/16 |
| 2016/0041808 A1* | 2/2016 | Pelland .................. G06F 3/162 |
| | | 700/94 |
| 2018/0032118 A1 | 2/2018 | Shimura et al. |
| 2019/0121415 A1 | 4/2019 | Tong et al. |
| 2020/0133371 A1 | 4/2020 | Chou et al. |

FOREIGN PATENT DOCUMENTS

| | | | | |
|---|---|---|---|---|
| CN | 106292989 A | * | 1/2017 | ............... G06F 1/32 |
| CN | 106299515 A | | 1/2017 | |
| CN | 111478407 A | | 7/2020 | |
| CN | 112117798 A | * | 12/2020 | ............... G06F 1/26 |
| CN | 112152291 A | | 12/2020 | |
| KR | 20130044135 A | | 5/2013 | |

* cited by examiner

| Message type | Message abstract |
|---|---|
| Control:Get Sink_Cap | A first PD chip requests to obtain a power supply capability supported by a second electronic device |
| Control:GoodCRC | Second PD chip: a previous packet is received and has passed integrity check |
| Data:Sink Capability | The second PD chip sends device information, including a power supply voltage and a power supply current |
| Control:GoodCRC | First PD chip: a previous packet is received and has passed integrity check |

FIG. 9

| Message type | Message abstract |
|---|---|
| Control:PR_Swap | A first PD chip requests to interchange power supply roles |
| Control:GoodCRC | Second PD chip: a previous packet is received and has passed integrity check |
| Control:Accept | The second PD chip accepts the request |
| Control:GoodCRC | First PD chip: a previous packet is received and has passed integrity check |
| Control:PS_Ready | First PD chip: a power supply is ready |
| Control:GoodCRC | Second PD chip: a previous packet is received and has passed integrity check |
| Control:PS_Ready | Second PD chip: a power supply is ready |
| Control:GoodCRC | First PD chip: a previous packet is received and has passed integrity check |

FIG. 10

CHARGING CONTROL METHOD, ELECTRONIC DEVICE, AND CHARGING CONTROL SYSTEM

CROSS-REFERENCE TO RELATED APPLICATIONS

This is a U.S. National Stage of International Application No. PCT/CN2022/114423 filed on Aug. 24, 2022, which claims priority to Chinese Patent Application No. 202111132066.2, filed with the China National Intellectual Property Administration on Sep. 26, 2021, both of which are incorporated herein by reference in their entireties.

TECHNICAL FIELD

This application relates to the field of electronic technologies, and in particular, to a charging control method, an electronic device, and a charging control system.

BACKGROUND

With rapid development of electronic devices, electronic devices such as notebook computers are increasingly widely used in people's life and work. Because a battery capacity of the notebook computer is usually greater than a battery capacity of an electronic device such as a mobile phone, when power of the electronic device such as the mobile phone is insufficient, the mobile phone may be charged by using the notebook computer.

Currently, some notebook computers cannot charge a mobile phone when being in a power-off state, and even if some notebook computers can charge a mobile phone when being in the power-off state, power consumption of the notebook computers is increased, which affects battery lives of the notebook computers.

SUMMARY

Embodiments of this application provide a charging control method, an electronic device, and a charging control system, so that a first electronic device charges a second electronic device when being in a power-off state, and power consumption of a first battery can be reduced, thereby prolonging a battery life of the first electronic device.

According to a first aspect, an embodiment of this application provides a charging control method applied to a first electronic device.

The first electronic device includes a first universal serial bus (universal serial bus, USB) port, a first battery, and an embedded controller separately connected to the first USB port and the first battery. The method includes: The embedded controller receives a wake-up signal when the first electronic device is in a power-off state and a second USB port of a second electronic device is connected to the first USB port, where the wake-up signal is generated based on a first power supply signal that is input by the second electronic device to the first USB port, and the wake-up signal is used to wake up the embedded controller; when the embedded controller is woken up, the embedded controller obtains device information of the second electronic device; and the embedded controller charges the second electronic device based on the device information by using the first battery. In this way, the first electronic device can charge the second electronic device when being in the power-off state. In addition, because the embedded controller is always in the power-off state when the first electronic device is in the power-off state and the first USB port is not connected to the second USB port, the first battery does not need to supply power to the embedded controller in this case. Therefore, power consumption of the first battery is reduced, thereby prolonging a battery life of the first electronic device.

In an optional implementation, that the embedded controller charges the second electronic device based on the device information by using the first battery includes: The embedded controller determines a device type of the second electronic device based on the device information, where the device information includes a power supply voltage and/or a power supply current; and the embedded controller charges the second electronic device by using the first battery when the device type of the second electronic device is a to-be-charged device. In this way, the device type of the second electronic device can be determined by using the power supply voltage and/or the power supply current, to determine whether the second electronic device is a to-be-charged device.

In an optional implementation, the device information includes the power supply current and the power supply voltage, and that the embedded controller determines a device type of the second electronic device based on the device information includes: The embedded controller calculates a product of the power supply current and the power supply voltage to obtain power supply power of the second electronic device; and the embedded controller determines the device type of the second electronic device based on the power supply power. Whether the second electronic device is a to-be-charged device can be determined based on the power supply power of the second electronic device. A method for detecting the device type is relatively simple, and a detection result is relatively accurate.

In an optional implementation, that the embedded controller determines the device type of the second electronic device based on the power supply power includes: When the power supply power is less than or equal to preset power, the embedded controller determines that the device type of the second electronic device is a to-be-charged device; and when the power supply power is greater than the preset power, the embedded controller determines that the device type of the second electronic device is a power supply device.

In an optional implementation, the device information includes the power supply voltage, and that the embedded controller determines a device type of the second electronic device based on the device information includes: When the power supply voltage is less than or equal to a preset voltage, the embedded controller determines that the device type of the second electronic device is a to-be-charged device; and when the power supply voltage is greater than the preset voltage, the embedded controller determines that the device type of the second electronic device is a power supply device. In this way, whether the second electronic device is a to-be-charged device can be determined based on the power supply voltage of the second electronic device, thereby decreasing a data amount when the second electronic device sends the device information to the first electronic device, and shortening transmission time of the device information.

In an optional implementation, the device information includes the power supply current, and that the embedded controller determines a device type of the second electronic device based on the device information includes: When the power supply current is less than or equal to a preset current, the embedded controller determines that the device type of the second electronic device is a to-be-charged device; and when the power supply current is greater than the preset current, the embedded controller determines that the device type of the second electronic device is a power supply device. In this way, whether the second electronic device is a to-be-charged device can be determined based on the power supply current of the second electronic device, thereby decreasing a data amount when the second electronic device sends the device information to the first electronic device, and shortening transmission time of the device information.

In an optional implementation, that the embedded controller charges the second electronic device by using the first battery when the device type of the second electronic device is a to-be-charged device includes: When the device type of the second electronic device is a to-be-charged device, the embedded controller obtains a first power value of the first battery; and the embedded controller charges the second electronic device by using the first battery when the first power value meets a preset condition. In this way, when determining that the second electronic device is a to-be-charged device, the embedded controller first determines whether the first power value of the first battery built in the first electronic device meets the preset condition, and charges the second electronic device only when the preset condition is met, so that the first electronic device has enough power for normal user while it is ensured that the second electronic device can be charged.

In an optional implementation, the preset condition is that the first power value is greater than a preset power value. When the first power value is greater than the preset power value, it is determined that the first power value of the first battery meets the preset condition.

In an optional implementation, before the embedded controller charges the second electronic device by using the first battery when the first power value meets the preset condition, further includes: The embedded controller obtains a second power value of a second battery in the second electronic device, where the preset condition is that the first power value is greater than the second power value. When the first power value is greater than the second power value of the second battery, it is determined that the first power value of the first battery meets the preset condition.

In an optional implementation, the first electronic device further includes a first power delivery (power delivery, PD) chip, and the first PD chip is connected between the first USB port and the embedded controller; and that the embedded controller obtains device information of the second electronic device includes: The embedded controller sends device information query signaling to the first PD chip; and the embedded controller receives the device information returned by the first PD chip based on the device information query signaling, where the device information is obtained by the first PD chip from a second PD chip in the second electronic device.

In an optional implementation, the first electronic device further includes a first PD chip and a charging management chip, the first PD chip is connected between the first USB port and the embedded controller, and the charging management chip is connected between the first USB port and the first battery; and that the embedded controller charges the second electronic device based on the device information by using the first battery includes: The embedded controller sends power supply role switching signaling to the first PD chip based on the device information, so that the first PD chip switches a power supply role of the first electronic device from a powered device to a power supply device based on the power supply role switching signaling, where when the power supply role of the first electronic device is switched from a powered device to a power supply device, a charging path formed by the first battery, the charging management chip, and the first USB port is conducted. In this way, in this application, based on hardware circuit control, when the power supply role of the first electronic device is switched to a power supply device, the charging path formed by the first battery, the charging management chip, and the first USB port is conducted, so that the first battery in the first electronic device charges the second battery in the second electronic device. Response time of the first battery is short, and the first electronic device can perform reverse charging on the second electronic device through quick switching.

In an optional implementation, the first electronic device further includes a first PD chip and a charging management chip, the first PD chip is connected between the first USB port and the embedded controller, the charging management chip is connected between the first USB port and the first battery, and the charging management chip is further connected to the embedded controller; and that the embedded controller charges the second electronic device based on the device information by using the first battery includes: The embedded controller sends power supply role switching signaling to the first PD chip based on the device information; the embedded controller receives a power supply role switching message returned by the first PD chip based on the power supply role switching signaling; and when the power supply role switching message is that a power supply role of the first electronic device is switched from a powered device to a power supply device, the embedded controller sends a control instruction to the charging management chip, so that the charging management chip transmits, to the first USB port, a power supply signal provided by the first battery. In this way, after receiving the power supply role switching message returned by the first PD chip, the embedded controller in this application controls the charging management chip only when determining that power supply role switching succeeds, to conduct a charging path formed by the first battery, the charging management chip, and the first USB port, thereby improving accuracy of charging the second electronic device by the first battery, and reducing power consumption of the first battery caused by incorrectly determining that power supply role switching succeeds.

In an optional implementation, the first electronic device further includes a first PD chip, a charging management chip, and a switch module, the first PD chip is connected between the first USB port and the embedded controller, the charging management chip is separately connected to the first USB port and the switch module, and the switch module is further connected to the first battery and the embedded controller; and that the embedded controller charges the second electronic device based on the device information by using the first battery includes: The embedded controller sends power supply role switching signaling to the first PD chip based on the device information; the embedded controller receives a power supply role switching message returned by the first PD chip based on the power supply role switching signaling; and when the power supply role switching message is that a power supply role of the first electronic device is switched from a powered device to a power supply device, the embedded controller controls the switch module to be turned on, so that a charging path formed by the first battery, the charging management chip, and the first USB port is conducted. The switch module is a second switch module. In this way, after receiving the power supply role switching message returned by the first PD chip, the embedded controller in this application controls the switch module only when determining that power supply role switching succeeds, to conduct the charging path formed by the first battery, the charging management chip, and the first USB port, thereby improving accuracy of charging the second electronic device by the first battery, and reducing power consumption of the first battery caused by incorrectly determining that power supply role switching succeeds.

In an optional implementation, the first electronic device further includes a charging management chip, and the charging management chip is further separately connected to the first USB port and the embedded controller; and that the embedded controller receives a wake-up signal includes: The embedded controller receives the wake-up signal sent by the charging management chip, where the wake-up signal is generated after the charging management chip is woken up by a second power supply signal, and the second power supply signal is generated based on the first power supply signal. This application provides a manner of waking up the embedded controller by using the charging management chip.

In an optional implementation, the first electronic device further includes a voltage conversion module, the voltage conversion module is connected between the first USB port and a charging management chip, the charging management chip is woken up by a second power supply signal sent by the voltage conversion module, and the second power supply signal is generated after the voltage conversion module performs voltage conversion on the first power supply signal. Based on the voltage conversion module, the charging management chip in this application is enabled to be applicable to the second electronic device that can provide power supply signals with different voltage values.

In an optional implementation, that the embedded controller receives a wake-up signal includes: The embedded controller receives the wake-up signal sent by the first USB port, where the wake-up signal is the first power supply signal that is input by the second electronic device to the first USB port. In this way, the embedded controller can be woken up directly by using the first power supply signal that is input through the first USB port, thereby simplifying a connection relationship of the first electronic device.

In an optional implementation, after the embedded controller obtains the device information of the second electronic device, the method further includes: When determining, based on the device information, that a device type of the second electronic device is a power supply device, the embedded controller continues to control the first PD chip to set the power supply role of the first electronic device to a powered device, so that a power supply signal provided by the second electronic device is input to the first battery through the first USB port and the charging management chip. In this way, the first electronic device in this application may also receive a charging operation performed on the first electronic device by the second electronic device serving as a power supply device.

In an optional implementation, after the embedded controller obtains the first power value of the first battery, the method further includes: When the first power value does not meet the preset condition, the embedded controller controls a power supply path between the first USB port and the second USB port to be disconnected. In this way, when power of the first battery is insufficient in this application, the power supply path between the first USB port and the second USB port is controlled to be disconnected, to save power of the battery in the second electronic device 40.

In an optional implementation, after the embedded controller charges the second electronic device by using the first battery, the method further includes: In a process in which the first battery charges the second electronic device, the embedded controller regularly obtain a third power value of the first battery; and when the third power value does not meet the preset condition, the embedded controller controls the first battery to stop charging the second electronic device. In this way, in this application, a power value of the first battery is regularly monitored, and when power of the rust battery is insufficient, the first battery may be enabled to stop charging the second electronic device, so as to prevent excessive power consumption of the first battery from affecting normal user of the first electronic device.

According to a second aspect, an embodiment of this application provides an electronic device, including an embedded controller and a memory The memory stores computer-executable instructions, and the embedded controller is configured to execute the computer-executable instructions stored in the memory, so that the embedded controller performs the foregoing charging control method.

According to a third aspect, an embodiment of this application provides a computer-readable storage medium. The computer-readable storage medium stores a computer program or instructions, and when the computer program or the instructions are run, the foregoing charging control method is implemented.

According to a fourth aspect, an embodiment of this application provides a charging control system. The charging control system includes a first electronic device and a second electronic device, and the first electronic device is the foregoing electronic device. The second electronic device is configured to: provide a first power supply signal for the first electronic device when the first electronic device is in a power-off state and a second USB port of the second electronic device is connected to a first USB port of the first electronic device; and when an embedded controller in the first electronic device is woken up, receive a power supply signal that is output by the first electronic device.

Effects of various possible implementations of the second aspect to the fourth aspect are similar to effects of the first aspect and the possible designs of the first aspect, and details are not described herein again.

BRIEF DESCRIPTION OF DRAWINGS

FIG. 9 is a schematic diagram of signaling in which a first PD chip obtains device information from a second PD chip according to an embodiment of this application:

FIG. 10 is a schematic diagram of signaling of power supply role switching between a first PD chip and a second PD chip according to an embodiment of this application;

DESCRIPTION OF EMBODIMENTS

Figure 1:
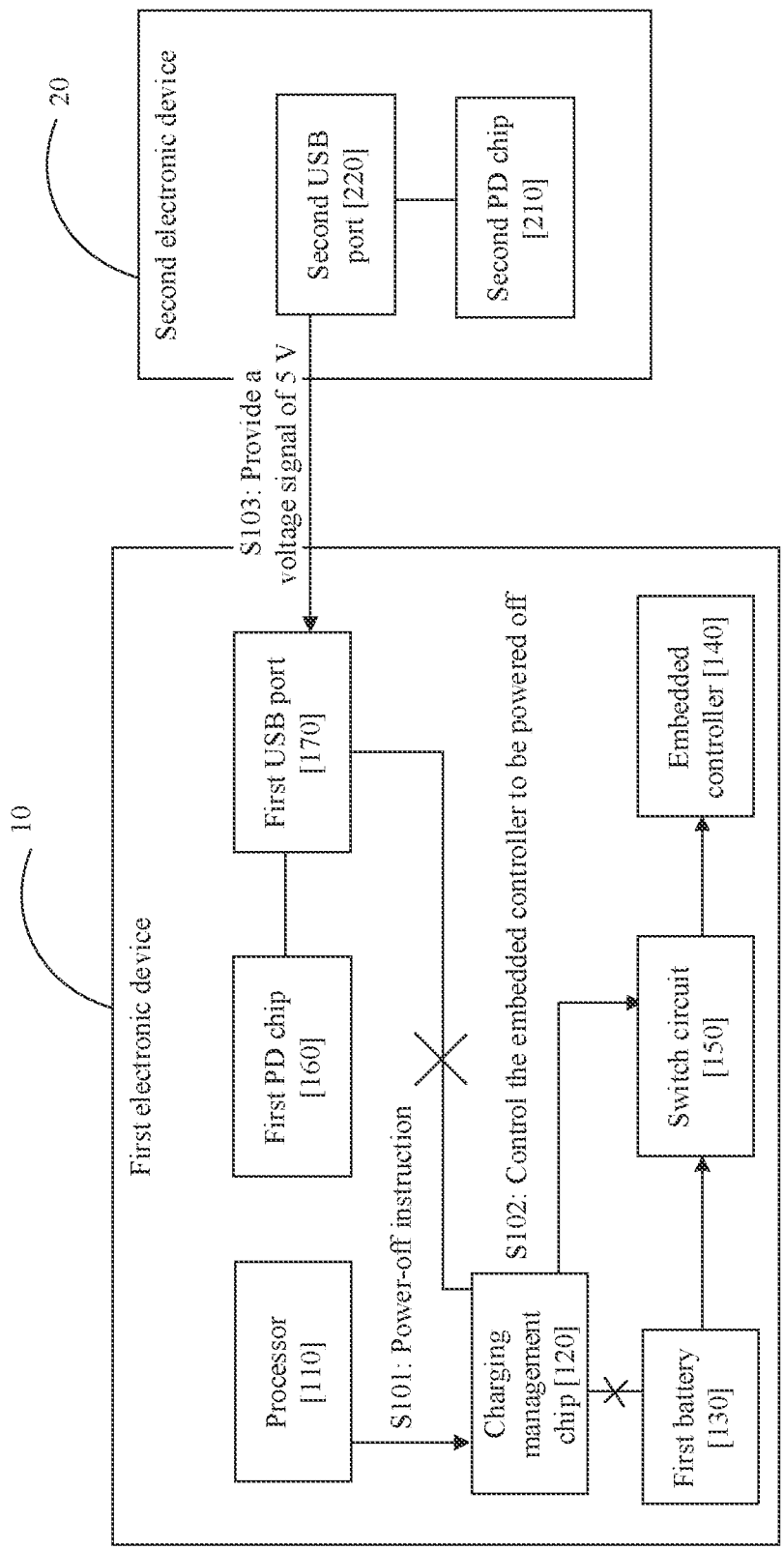
FIG. 1 is a schematic diagram of interaction between a first electronic device and a second electronic device in a related technology.

To clearly describe technical solutions in embodiments of this application, in embodiments of this application, words such as "first" and "second" are used to distinguish between same items or similar items with basically the same functions and effects. For example, a first chip and a second chip are merely intended to distinguish between different chips, and are not intended to limit a sequence of the first chip and the second chip. A person skilled in the art may understand that the words such as "first" and "second" do not limit a quantity and an execution sequence, and the words such as "first" and "second" do not indicate a definite difference.

It should be noted that the word "example", "for example", or the like in embodiments of this application is used to represent giving an example, an illustration, or a description. Any embodiment or design solution described as "example" or "for example" in this application should not be construed as being preferred or advantageous over other embodiments or design solutions. Exactly, use of the word such as "example" or "for example" is intended to present a related concept in a specific manner.

In embodiments of this application, "at least one" means one or more, and "a plurality of" means two or more. "And/Or" describes an association relationship between associated objects, and represents that three relationships may exist. For example, "A and/or B" may represent the following cases: Only A exists, both A and B exist, and only B exists, where A and B may be singular or plural. The character "/" usually indicates an "or" relationship between associated objects. "At least one of the following items" or a similar expression thereof means any combination of these items, including a single item or any combination of a plurality of items. For example, at least one of a, b, or c may represent a, b, c, a-b, a-c, b-c, or a-b-c, where a, b, and c may be singular or plural.

With rapid development of electronic devices, use frequency and use duration of the electronic device such as a mobile phone or a wearable device by a user gradually increase. As a result, power consumption of the electronic device such as the mobile phone or the wearable device is gradually increased, and power of a battery in the electronic device is easy to be consumed completely. Therefore, the electronic device needs to be charged in time, so that the electronic device can be normally used.

Currently, the user usually inserts one end of a charger into a fixed socket serving as a power supply source, and connects the other end of the charger to a USB port of the electronic device, to charge the electronic device such as the mobile phone or the wearable device. However, in some scenarios, for example, in a process of taking a high-speed railway or during a meeting, if a fixed socket serving as a power supply source is not disposed in an environment in which the user is located, or there is no idle fixed socket, the electronic device such as the mobile phone or the wearable device cannot be charged by using the fixed socket. Therefore, when it is difficult for the user to find a fixed socket, a notebook computer may be used to charge the electronic device such as the mobile phone or the wearable device.

As shown in FIG. 1, a notebook computer is referred to as a first electronic device 10, and a mobile phone is referred to as a second electronic device 20. The first electronic device 10 includes a processor 110, a charging management chip 120, a first battery 130, an embedded controller 140, a switch circuit 150, a first PD chip 160, and a first USB port 170. The processor 110, the charging management chip 120, and the switch circuit 150 are successively connected, the switch circuit 150 is further connected between the first battery 130 and the embedded controller 140, and the first PD chip 160 is connected to the first USB port 170. The second electronic device 20 includes a second PD chip 210 and a second USB port 220 that are connected to each other. In addition, a second battery (not shown) is also disposed in the second electronic device 20.

When a user does not use the first electronic device 10, the first electronic device 10 may be triggered to perform a power-off operation. As shown in FIG. 1, in a related technology, when the first electronic device 10 performs the power-off operation, the processor 110 performs S101 to send a power-off instruction to the charging management chip 120. After receiving the power-off instruction, the charging management chip 120 performs S102 to control the switch circuit 150 to be turned off, so that a power supply path between the first battery 130 and the embedded controller 140 is disconnected. In this case, the first battery 130 stops supplying power to the embedded controller 140, so that the embedded controller 140 is powered off. In other words, when the first electronic device 10 is in a power-off state, the embedded controller 140 also remains in a power-off state.

When the first electronic device 10 is in the power-off state and the embedded controller 140 is also in the power-off state, if the second USB port 220 of the second electronic device 20 is connected to the first USB port 170 of the first electronic device 10, the second electronic device 20 performs S103 to provide a voltage signal of 5 V for the first USB port 170. However, the voltage signal of 5 V does not wake up the charging management chip 120, and therefore the embedded controller 140 cannot be further woken up. Because the embedded controller 140 is in the power-off state, the embedded controller 140 cannot control the first battery 130 to charge the second electronic device 20.

It should be noted that, an arrow carried by a connection line connected between two components in FIG. 1 indicates a transmission direction of a signal or data in this embodiment of this application. Actually, the first USB port 170 is also connected to the charging management chip 120 by using a cable, and the charging management chip 120 is also connected to the first battery 130 by using a cable. However, in the power-off state, signal transmission is not performed on the cable between the first USB port 170 and the charging management chip 120 and on the cable between the charging management chip 120 and the first battery 130.

To enable the first electronic device 10 to charge the second electronic device 20 when being in the power-off state, in another related technology, when performing the power-off operation, the first electronic device 10 does not control the embedded controller 140 to be powered off. In addition, when the first electronic device 10 is in the power-off state after performing the power-off operation, the first electronic device 10 still controls the embedded controller 140 not to be powered off.

When the first electronic device 10 is in the power-off state and the embedded controller 140 is not powered off all the time, if the second USB port 220 of the second electronic device 20 is connected to the first USB port 170 of the first electronic device 10, the embedded controller 140 may be used to control the first battery 130 to charge the second electronic device 20.

However, in this case, a power supply signal provided by the first battery 130 in the first electronic device 10 not only needs to be provided for the second electronic device 20, but also needs to be provided for the embedded controller 140 in the first electronic device 10 all the time. Regardless of whether the electronic device 20 is connected, the first battery 130 needs to supply power to the embedded controller 140 all the time. Consequently, power consumption of the first battery 130 in the first electronic device 10 is increased, which affects a battery life of the first electronic device 10.

In conclusion, it can be learned that in the related technology, in a first case, when the first electronic device 10 is in the power-off state, the embedded controller 140 is controlled to be in the power-off state, and the first electronic device 10 cannot charge the second electronic device 20 when being in the power-off state. In a second case, when the first electronic device 10 is in the power-off state, the embedded controller 140 is continuously controlled to remain in a power-on state, so as to charge the second electronic device 20 when the first electronic device 10 is in the power-off state. However, in this manner, power consumption of the first battery 130 in the first electronic device 10 is increased, which affects a battery life of the first electronic device 10.

Based on this, embodiments of this application provide a charging control method. According to the method, when a first electronic device is powered off, an embedded controller is controlled to be powered off. When a first USB port of the first electronic device is connected to a second USB port of a second electronic device, the embedded controller is woken up by using a first power supply signal that is input through the second USB port. When the embedded controller is woken up, the embedded controller may control, based on obtained device information of the second electronic device, a first battery to charge the second electronic device. Therefore, according to the method, the first electronic device can charge the second electronic device when being in a power-off state. In addition, because the embedded controller is always in a power-off state when the first electronic device is in the power-off state and the first USB port is not connected to the second USB port, the first battery does not need to supply power to the embedded controller. Therefore, power consumption of the first battery is reduced, thereby prolonging a battery life of the first electronic device.

The charging control method provided in the embodiments of this application is applicable to an electronic device such as a notebook computer. The electronic device is referred to as a first electronic device, and is configured to charge a second electronic device when being in a power-off state. The second electronic device may be an electronic device that needs to be charged, for example, a mobile phone, a wearable device (such as a band or a watch), a tablet computer, a mouse, or a headset.

Figure 2:
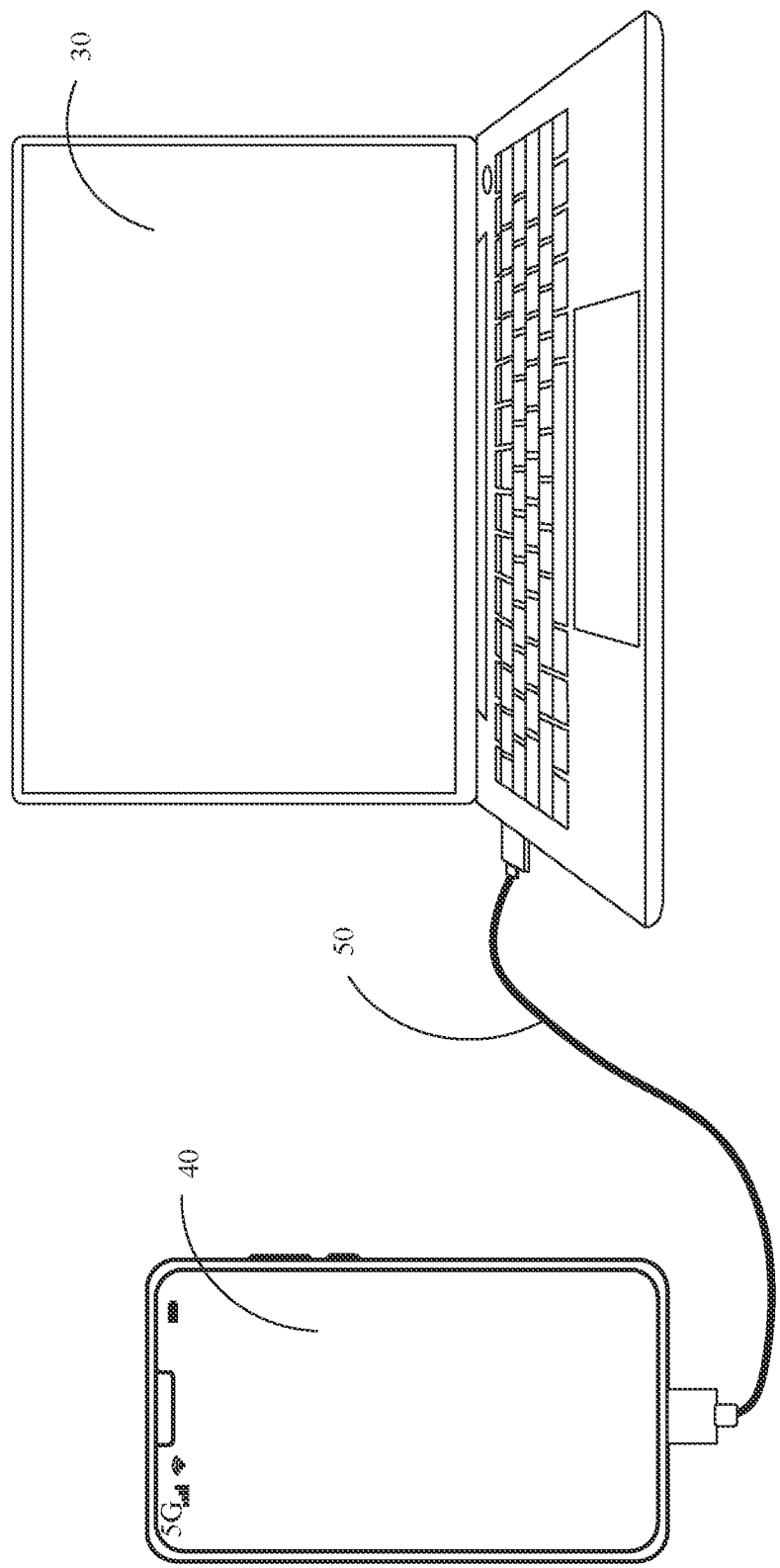
FIG. 2 is a schematic diagram of an application scenario of a charging control method according to an embodiment of this application.

To better understand the embodiments of this application, the following describes a scenario of a charging control system in the embodiments of this application. Referring to FIG. 2, the charging control system includes a first electronic device 30 and a second electronic device 40. Both the first electronic device 30 and the second electronic device 40 are electronic devices that have a USB port. When the first electronic device 30 is in a power-off state, the USB port of the first electronic device 30 may be connected to the USB port of the second electronic device 40 by using a charging cable 50. Subsequently, an example in which the first electronic device 30 is a notebook computer and the second electronic device 40 is a mobile phone is used for description.

Figure 3:
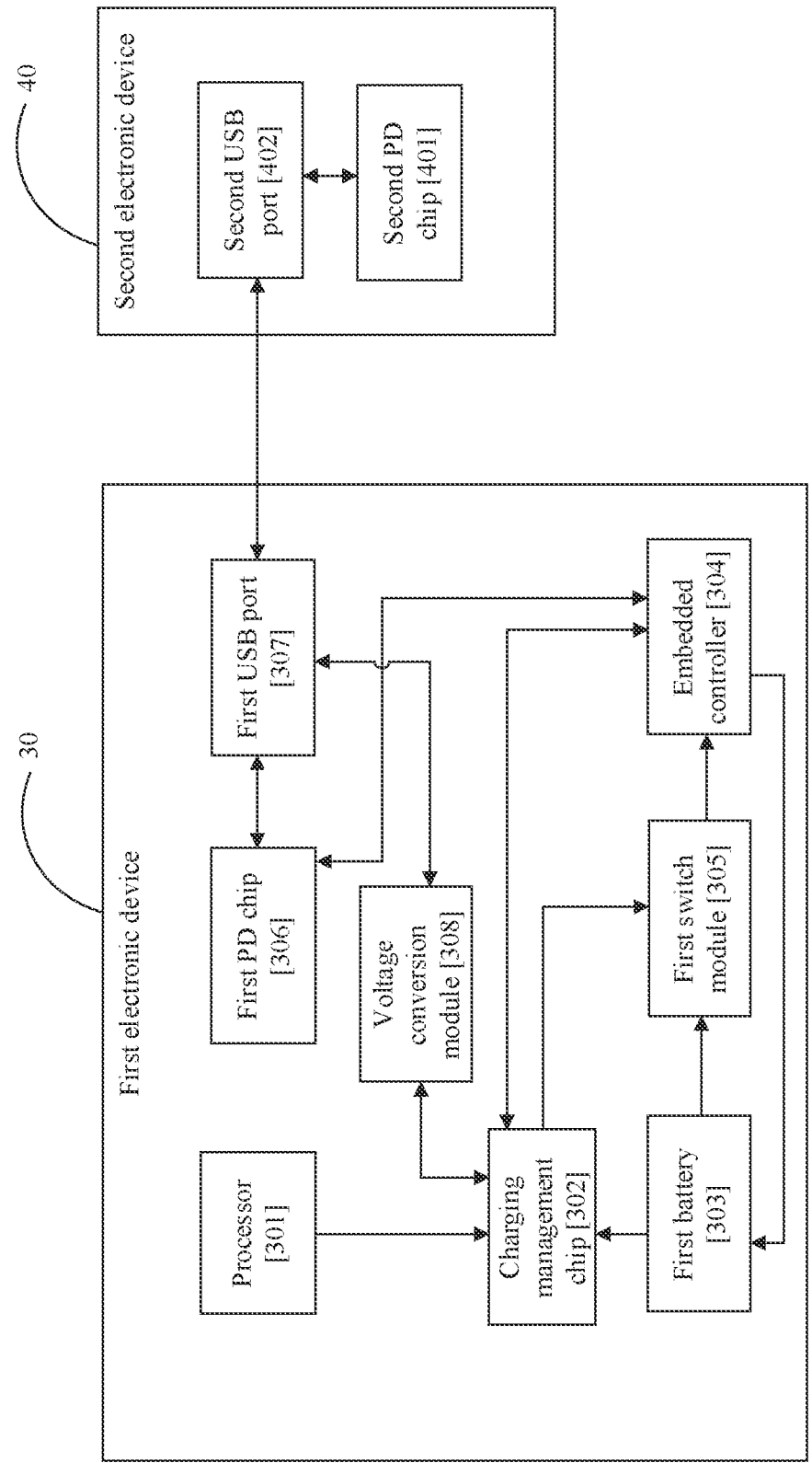
FIG. 3 is a schematic diagram of structures of a first electronic device and a second electronic device according to an embodiment of this application.

For example, FIG. 3 is a schematic diagram of structures of a first electronic device and a second electronic device according to an embodiment of this application. As shown in FIG. 3, the first electronic device 30 includes a processor 301, a charging management chip (charger IC) 302, a first battery 303, an embedded controller (embed controller, EC) 304, a first switch module 305, a first PD chip 306, a first USB port 307, and a voltage conversion module 308. The second electronic device 40 includes a second PD chip 401 and a second USB port 402. The first USB port 307 is a USB port of the first electronic device 30, the first PD chip 306 is a PD chip in the first electronic device 30, the second USB port 402 is a USB port of the second electronic device 40, and the second PD chip 401 is a PD chip in the second electronic device 40.

In the first electronic device 30, the processor 301, the charging management chip 302, and the first switch module 305 are successively connected, the first switch module 305 is connected in a path between the first battery 303 and the embedded controller 304, the embedded controller 304 is further separately connected to the first battery 303, the charging management chip 302, and the first PD chip 306, the charging management chip 302 is further separately connected to the first battery 303 and the voltage conversion module 308, the voltage conversion module 308 is further connected to the first USB port 307, and the first PD chip 306 is connected to the first USB port 307.

In the second electronic device 40, the second PD chip 401 is connected to the second USB port 402. In addition, a second battery (not shown) is further disposed in the second electronic device 40. The second battery may be directly connected to the second PD chip 401, or the second battery may be connected to the second PD chip 401 by using another electronic component. For example, the second battery is connected to the second PD chip 401 by using a charging management chip disposed in the second electronic device.

Figure 4:
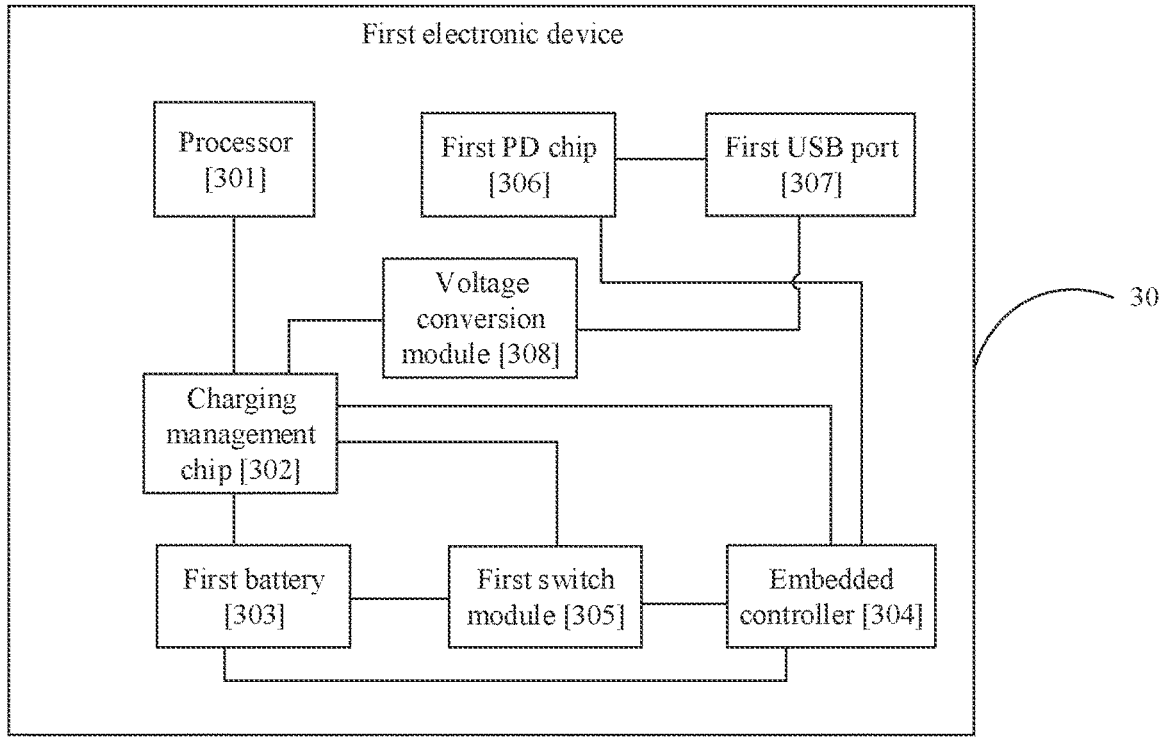
FIG. 4 is a schematic diagram of a circuit structure of a first electronic device according to an embodiment of this application.

It should be noted that, an arrow carried by a connection line connected between two components in FIG. 3 indicates a transmission direction of a signal or data in this embodiment of this application. If a signal transmission line is not considered, a specific circuit diagram of the first electronic device 30 shown in FIG. 3 is shown in FIG. 4.

The first USB port 307 of the first electronic device 30 may be a USB Type-C port, and an actual structure of the first USB port is manufactured into a USB Type-C socket. The second USB port 402 of the second electronic device 40 may also be a USB Type-C port, and an actual structure of the second USB port is also manufactured into a USB Type-C socket.

In this case, the charging cable 50 shown in FIG. 2 is a detachable double-headed USB Type-C charging cable, both ends of the charging cable 50 are USB Type-C plugs of a same structure, and the USB Type-C plugs at the two ends of the charging cable 50 may be respectively connected to the USB Type-C socket of the first electronic device 30 and the USB Type-C socket of the second electronic device 40, so that the first USB port 307 is connected to the second USB port 402.

Figure 5:
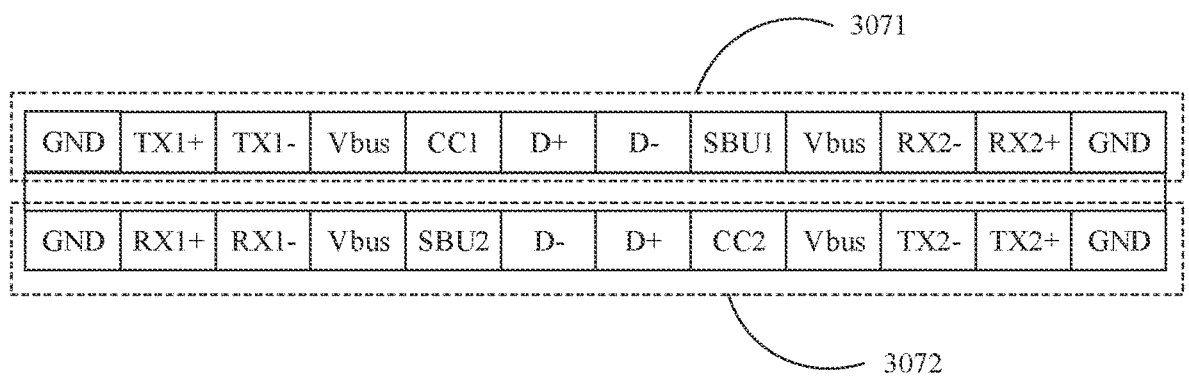
FIG. 5 is a schematic diagram of a structure of a Type-C port according to an embodiment of this application.

As shown in FIG. 5, the first USB port 307 of the first electronic device 30 includes a first pin group 3071 and a second pin group 3072 that are symmetrically distributed. The first pin group 3071 includes a GND pin, a TX1+ pin, a TX1− pin, a Vbus pin, a CC1 pin, a D+ pin, a D− pin, an SBU1 pin, a Vbus pin, an RX2− pin, an RX2+ pin, and a GND pin that are successively distributed. The second pin group 3072 includes a GND pin, an RX1+ pin, an RX1− pin, a Vbus pin, an SBU2 pin, a D− pin, a D+ pin, a CC2 pin, a Vbus pin, a TX2− pin, a TX2+ pin, and a GND pin that are successively distributed. The GND pin is a ground pin, the CC pin is a configuration channel (configuration channel, CC) pin, and the SBU pin is a side band use (side band use, SBU) pin.

The following describes a function of each pin. The D+ pin and the D− pin: When a USB 3.0 interface is unavailable, the D+ pin and the D− pin provide a signal channel for a USB 2.0 signal. The Vbus pin and the GND pin can provide a power supply capability for an upstream data interface, or support point-to-point power supply in some cases. The TX1/2 pin and the RX1/2 pin provide an ultra-speed data link between a maximum of two channels, to implement a maximum of a 20 Gbps bidirectional bandwidth. The CC1 pin and the CC2 pin are used to discover, configure, and manage a connected external device. One CC pin in the CC1 pin and the CC2 pin is used as a configuration channel, and the other CC pin may be connected to Vconn when an electronic device on which the CC pin is located is a power supply device, and is used to supply power to an Emark chip in the charging cable. The SBU1 pin and the SUB2 pin are suitable for transmission of a non-USB signal, for example, used to transmit an analog audio signal.

It may be understood that pins included in the second USB port 402 of the second electronic device 40 are similar to those shown in FIG. 5. To avoid repetition, details are not described herein again.

Figure 6A:
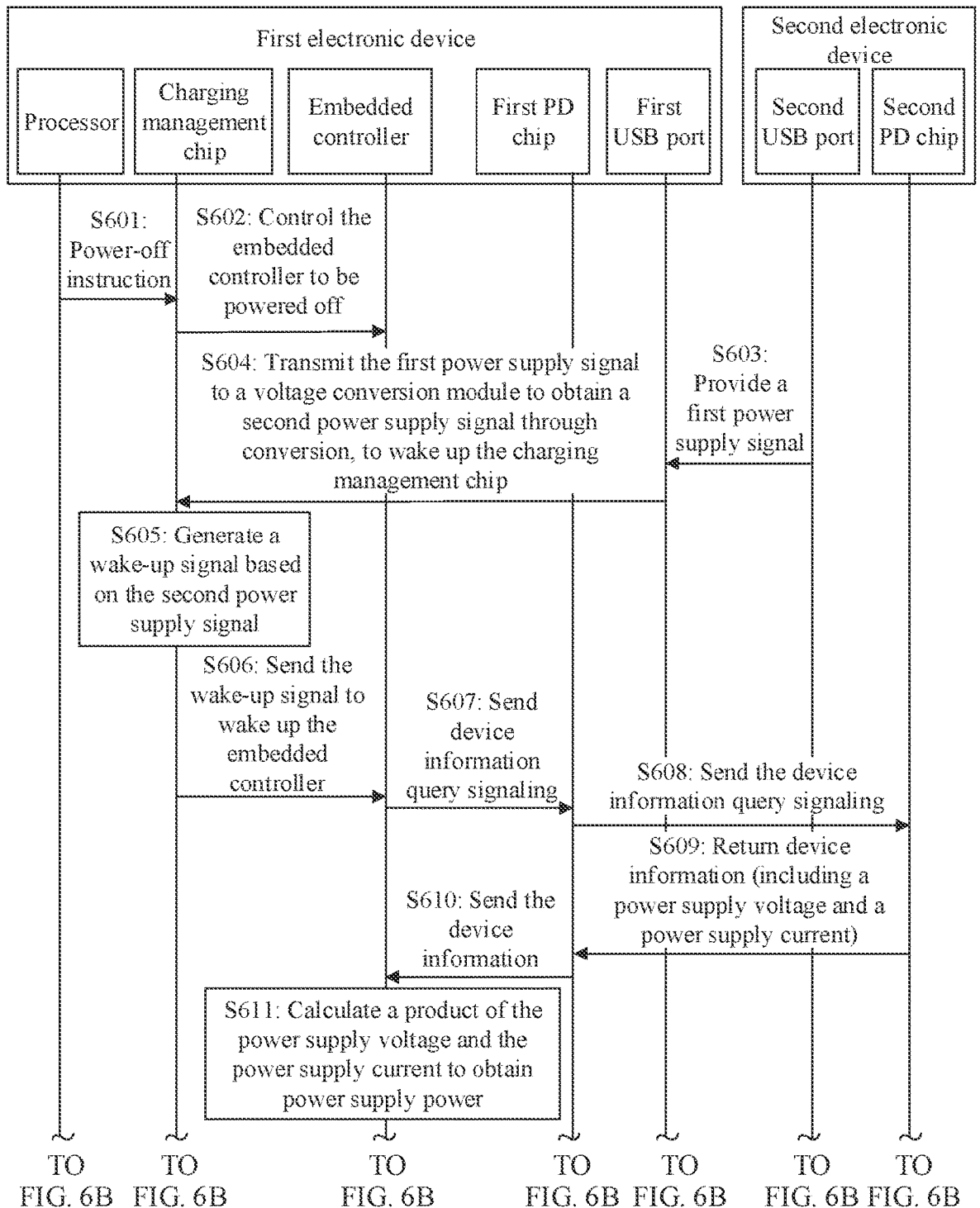
FIG. 6A and FIG. 6B are a flowchart of a charging control method according to an embodiment of this application.
Figure 6B:
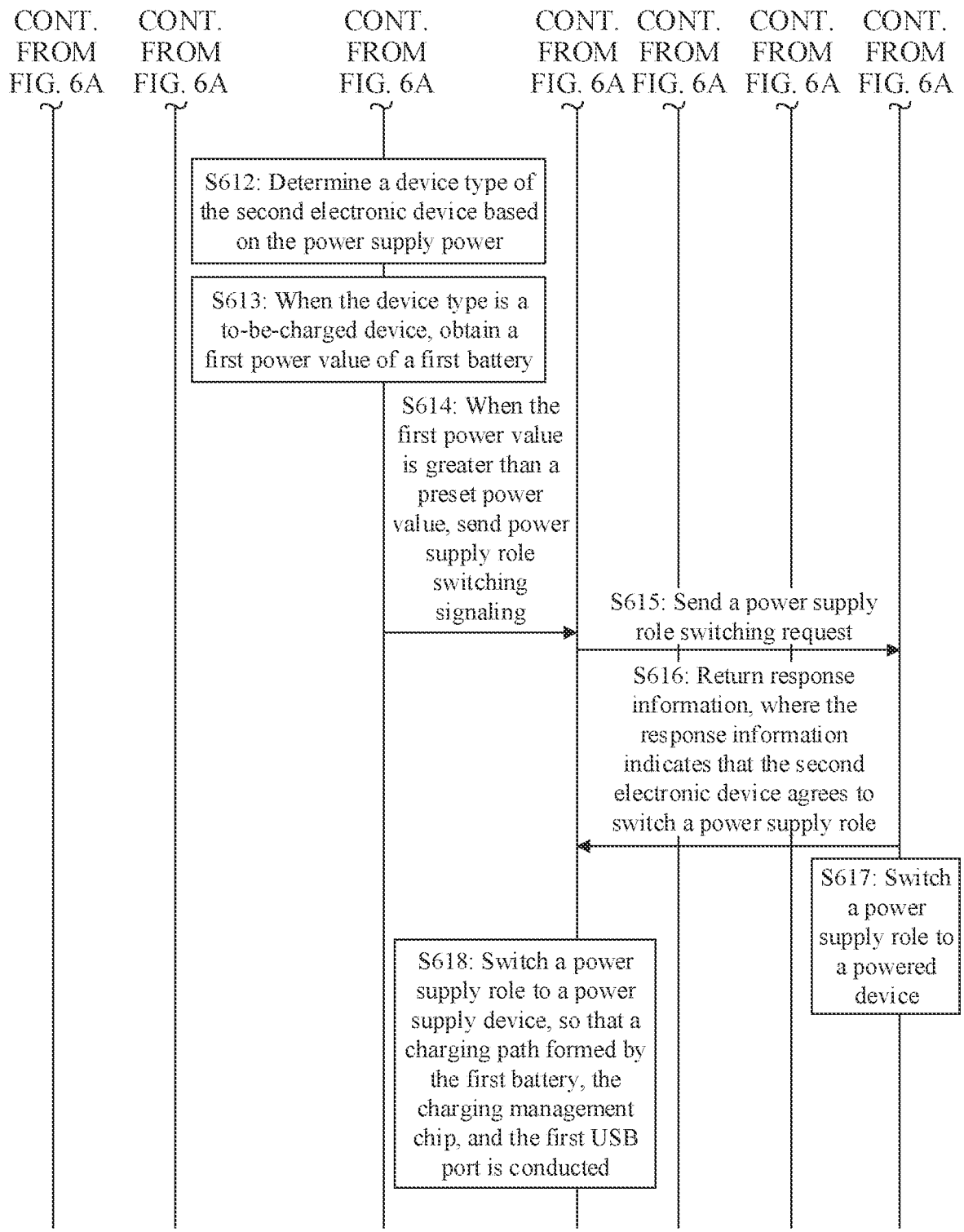

FIG. 6A and FIG. 6B are a flowchart of a charging control method according to an embodiment of this application. The charging control method may be applied to the first electronic device 30 shown in FIG. 3, and may specifically include the following steps.

S601: A processor sends a power-off instruction to a charging management chip.

When a user does not need to use the first electronic device 30, the user may long press a power on/off button disposed on the first electronic device 30, or may click, by using a mouse, a power-off control displayed on a display screen of the first electronic device 30, or use another manner, to trigger the processor 301 in the first electronic device 30 to generate a power-off instruction, and the processor 301 sends the power-off instruction to the charging management chip 302.

S602. The charging management chip controls an embedded controller to be powered off.

After receiving the power-off instruction sent by the processor 301, the charging management chip 302 sends a control signal to the first switch module 305, so that the first switch module 305 is turned off, and a power supply path between the first battery 303 and the embedded controller 304 is disconnected. In this case, the first battery 303 stops supplying power to the embedded controller 304, so that the embedded controller 304 is powered off.

In some embodiments, the first switch module 305 may be a switch transistor. A gate of the switch transistor is connected to the charging management chip 302, a source of the switch transistor is connected to the first battery 303, and a drain of the switch transistor is connected to the embedded controller 304. In one case, the switch transistor is an N-type transistor, and the control signal is a low-level signal. When the charging management chip 302 inputs the low-level signal to the gate of the switch transistor, the switch transistor is cut off, and the power supply path between the first battery 303 and the embedded controller 304 is disconnected. In another case, the switch transistor is a P-type transistor, and the control signal is a high-level signal. When the charging management chip 302 inputs the high-level signal to the gate of the switch transistor, the switch transistor is cut off, and the power supply path between the first battery 303 and the embedded controller 304 is disconnected.

S603: When a first electronic device is in a power-off state, and a second USB port of a second electronic device is connected to a first USB port, the second electronic device provides a first power supply signal for the first USB port through the second USB port.

When the first electronic device 30 is in the power-off state, if the user needs to charge the second electronic device 40 by using the first electronic device 30, the user may connect the first USB port 307 of the first electronic device 30 to the second USB port 402 of the second electronic device 40 by using the charging cable 50.

A CC connection line is disposed inside the charging cable 50. After the charging cable 50 is separately connected to the first USB port 307 and the second USB port 402, the CC1 pin or the CC2 pin in the first USB port 307 may be connected to the CC1 pin or the CC2 pin in the second USB port 402 by using the CC connection line in the charging cable 50.

In this embodiment of this application, a working mode of the first USB port 307 is a dual role port (dual role port, DRP) mode, and a working mode of the second USB port 402 is also the DRP mode. The DRP mode may be used as both a downstream facing port (downstream facing port, DFP) mode and an upstream facing port (upstream facing port, UFP) mode. Therefore, after the first USB port 307 is connected to the second USB port 402 by using the charging cable 50, working modes of the first USB port 307 and the second USB port 402 need to be determined, to determine a master-slave relationship between the first electronic device 30 and the second electronic device 40. Specifically, the working modes of the first USB port 307 and the second USB port 402 may be determined by using a first interface controller in the first electronic device 30 and a second interface controller in the second electronic device 40.

Figure 7:
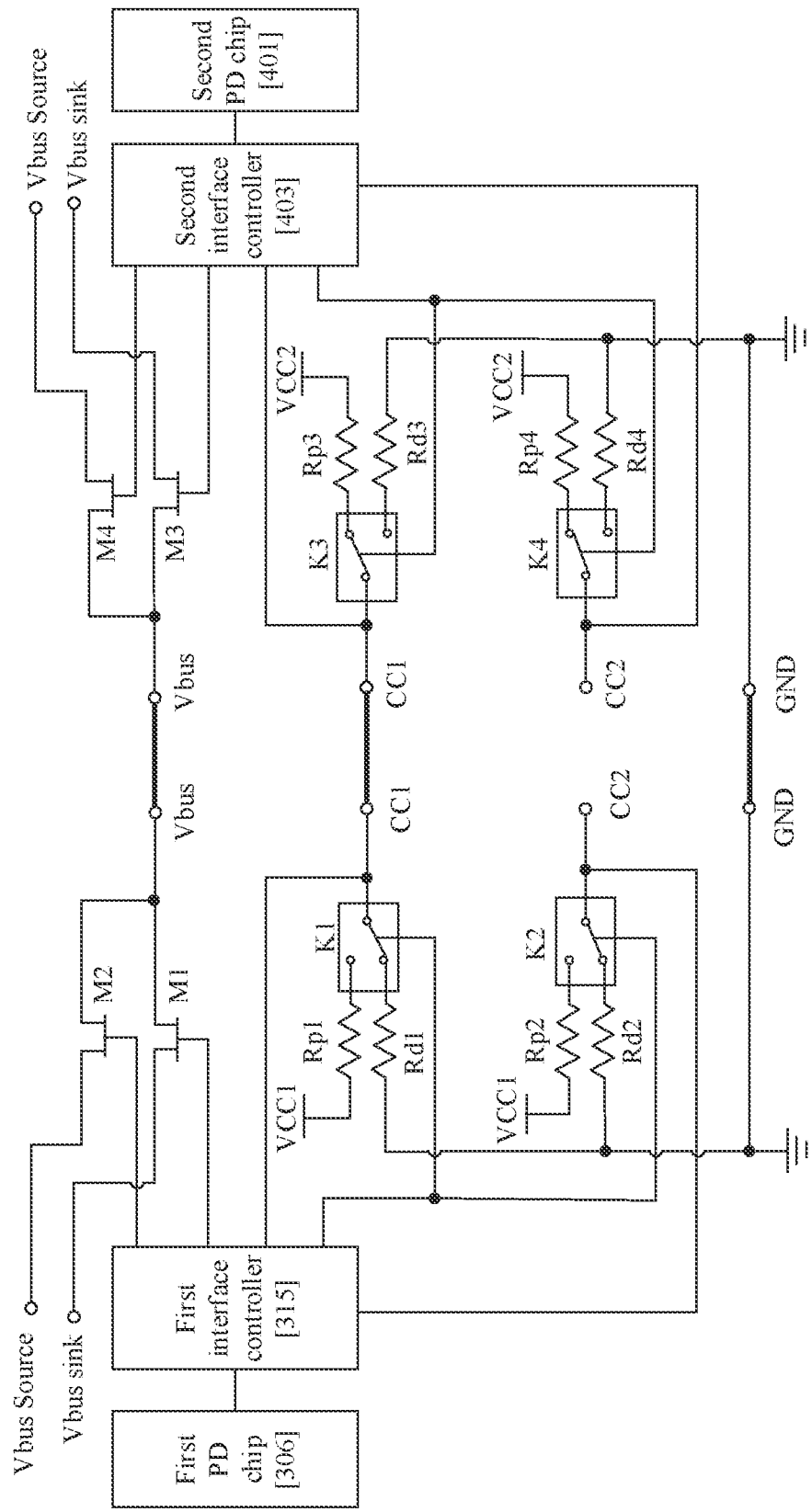
FIG. 7 is a schematic diagram of a connection when a first electronic device is a powered device and a second electronic device is a power supply device according to an embodiment of this application.

As shown in FIG. 7, in the first electronic device 30, a first interface control circuit is further disposed between the first PD chip 306 and the first USB port 307. The first interface control circuit includes a first interface controller 315, a first switch K1, a second switch K2, a first switch transistor M1, a second switch transistor M2, a first pull-up resistor Rp1, a first pull-down resistor Rd1, a second pull-up resistor Rp2, and a second pull-down resistor Rd2. The Vbus pin, the CC1 pin, the CC2 pin, and the GND pin that are connected to the first interface controller 315 all are pins included in the first USB port 307.

The first PD chip 306 is connected to the first interface controller 315. The first interface controller 315 is further connected to a gate of the first switch transistor M1 and a gate of the second switch transistor M2. A source (that is, a Vbus sink) of the first switch transistor M1 and a source (that is, a Vbus Source) of the second switch transistor M2 are connected to the voltage conversion module 308. A drain of the first switch transistor M1 and a drain of the second switch transistor M2 are connected to the Vbus pin in the first USB port 307.

A control terminal of the first switch K1 is connected to the first interface controller 315. Under control of the first interface controller 315, the first switch K1 may switch the CC1 pin in the first USB port 307 to connect to a first terminal of the first pull-up resistor Rp1, or switch the CC1 pin in the first USB port 307 to connect to a first terminal of the first pull-down resistor Rd1. A second terminal of the first pull-up resistor Rp1 is connected to a first high-level signal terminal VCC1, and a second terminal of the first pull-down resistor Rd1 is connected to a ground terminal. A control terminal of the second switch K2 is connected to the first interface controller 315. Under control of the first interface controller 315, the second switch K2 may switch the CC2 pin in the first USB port 307 to connect to a first terminal of the second pull-up resistor Rp2, or switch the CC2 pin in the first USB port 307 to connect to a first terminal of the second pull-down resistor Rd2. A second terminal of the second pull-up resistor Rp2 is connected to a first high-level signal terminal VCC1, a second terminal of the second pull-down resistor Rd2 is also connected to the ground terminal, and the GND pin in the first USB port 307 is also connected to the ground terminal.

In addition, the first interface controller 315 is further connected between the first switch K1 and the CC1 pin in the first USB port 307, to detect a voltage of the CC1 pin in the first USB port 307. The first interface controller 315 is further connected between the second switch K2 and the CC2 pin in the first USB port 307, to detect a voltage of the CC2 pin in the first USB port 307.

Correspondingly, in the second electronic device 40, a second interface control circuit is disposed between the second PD chip 401 and the second USB port 402, and the second interface control circuit includes a second interface controller 403, a third switch K3, a fourth switch K4, a third switch transistor M3, a fourth switch transistor M4, a third pull-up resistor Rp3, a third pull-down resistor Rd3, a fourth pull-up resistor Rp4, and a fourth pull-down resistor Rd4. The Vbus pin, the CC1 pin, the CC2 pin, and the GND pin that are connected to the second interface controller 403 all are pins included in the second USB port 402.

The second PD chip 401 is connected to the second interface controller 403. The second interface controller 403 is further connected to a gate of the third switch transistor M3 and a gate of the fourth switch transistor M4. A source (that is, a Vbus sink) of the third switch transistor M3 and a source (that is, a Vbus Source) of the fourth switch transistor M4 are connected to components such as the charging management chip in the second electronic device. Both a drain of the third switch transistor M3 and a drain of the fourth switch transistor M4 are connected to the Vbus pin in the second USB port 402.

A control terminal of the third switch K3 is connected to the second interface controller 403. Under control of the second interface controller 403, the third switch K3 may switch the CC1 pin in the second USB port 402 to connect to a first terminal of the third pull-up resistor Rp3, or switch the CC1 pin in the second USB port 402 to connect to a first terminal of the third pull-down resistor Rd3. A second terminal of the third pull-up resistor Rp3 is connected to a second high-level signal terminal VCC2, and a second terminal of the third pull-down resistor Rd3 is connected to a ground terminal. A control terminal of the fourth switch K4 is connected to the second interface controller 403. Under control of the second interface controller 403, the fourth switch K4 may switch the CC2 pin in the second USB port 402 to connect to a first terminal of the fourth pull-up resistor Rp4, or switch the CC2 pin in the second USB port 402 to connect to a first terminal of the fourth pull-down resistor Rd4. A second terminal of the fourth pull-up resistor Rp4 is connected to the second high-level signal terminal VCC2, a second terminal of the fourth pull-down resistor Rd4 is also connected to the ground terminal, and GND pin in the second USB port 402 is also connected to the ground terminal.

In addition, the second interface controller 403 is further connected between the third switch K3 and the CC1 pin in the second USB port 402, to detect a voltage of the CC1 pin in the second USB port 402. The second interface controller 403 is further connected between the fourth switch K4 and the CC2 pin in the second USB port 402, to detect a voltage of the CC2 pin in the second USB port 402.

In this embodiment of this application, when the first electronic device 30 is in the power-off state, the first switch K1 connects the CC1 pin in the first USB port 307 to the first terminal of the first pull-down resistor Rd1 by default, and the second switch K2 connects the CC2 pin in the first USB port 307 to the first terminal of the second pull-down resistor Rd2 by default. In other words, the working mode of the first USB port 307 is set to the UFP mode by default. In this case, both the first switch transistor M1 and the second switch transistor M2 are in a cut-off state.

If the second USB port 402 is connected to the first USB port 307 by using the charging cable 50, the second PD chip 401 sends a control instruction to the second interface controller 403, so that the second interface controller 403 periodically switches the third switch K3, to connect the CC1 pin in the second USB port 402 to the first terminal of the third pull-up resistor Rp3, or connect the CC1 pin in the second USB port 402 to the first terminal of the third pull-down resistor Rd3. In addition, the second interface controller 403 also periodically switches the fourth switch K4, to connect the CC2 pin in the second USB port 402 to the first terminal of the fourth pull-up resistor Rp4, or connect the CC2 pin in the second USB port 402 to the first terminal of the fourth pull-down resistor Rd4. In other words, the second interface controller 403 periodically switches the working mode of the second USB port 402 between the DFP mode and the UFP mode.

When the second interface controller 403 switches the working mode of the second USB port 402 to the DFP mode, the third switch K3 connects the CC1 pin in the second USB port 402 to the third pull-up resistor Rp3, and the fourth switch K4 connects the CC2 pin in the second USB port 402 to the fourth pull-up resistor Rp4. If the CC connection line in the charging cable 50 connects the CC1 pin in the first USB port 307 to the CC1 pin in the second USB port 402, because the CC1 pin in the first USB port 307 is connected to the first pull-down resistor Rd1, the second interface controller 403 detects that a level at the CC1 pin in the second USB port 402 is pulled down, and the first interface controller 315 detects that a level at the CC1 pin in the first USB port 307 is pulled up. In this case, it is determined that the CC1 pin in the first USB port 307 is connected to the CC1 pin in the second USB port, and it is determined that the working mode of the first USB port 307 is the UFP mode.

When the second interface controller 403 switches the working mode of the second USB port 402 to the UFP mode, the third switch K3 connects the CC1 pin in the second USB port 402 to the third pull-down resistor Rd3, and the fourth switch K4 connects the CC2 pin in the second USB port 402 to the fourth pull-down resistor Rd4. If the CC connection line in the charging cable 50 connects the CC1 pin in the first USB port 307 to the CC1 pin in the second USB port 402, the second interface controller 403 detects that the level at the CC1 pin in the second USB port 402 is still a low level, and the first interface controller 315 also detects that the level at the CC1 pin of the first USB port 307 is still a low level, and continues to wait for the second interface controller 403 to switch the working mode of the second USB port 402 to the DFP mode, so as to determine that the working mode of the first USB port 307 is the UFP mode.

It should be noted that, after detecting that the level at the CC1 pin in the second USB port 402 is pulled down, the second interface controller 403 may determine that the working mode of the first USB port 307 connected to the second USB port 402 is the UFP mode. In this case, the second interface controller 403 continues to control the third switch K3 to connect the CC1 pin in the second USB port 402 to the third pull-up resistor Rp3, that is, keeps the working mode of the second USB port 402 in the DFP mode, and no longer periodically switches the working mode of the second USB port 402 between the DFP mode and the UFP mode.

When detecting that the level at the CC1 pin in the first USB port 307 is pulled up, the first interface controller 315 determines that the CC1 pin in the first USB port 307 is connected to a CC pin (CC1 or CC2) of the second electronic device 40, and determines that the working mode of the first USB port 307 is the UFP mode. The first interface controller 315 sends, to the first PD chip 306, mode information indicating that the first USB port 307 is in the UFP mode, and the first PD chip 306 sends a control instruction to the first interface controller 315, so that the first interface controller 315 controls the first switch transistor M1 to be turned on. Correspondingly, after the second interface controller 403 detects that the level at the CC1 pin in the second USB port 402 is pulled down, the second PD chip 401 controls the second interface controller 403 to set the working mode of the second USB port 402 to the DFP mode, and the second PD chip 401 sends a control instruction to the second interface controller 403, so that the second interface controller 403 controls the fourth switch transistor M4 to be turned on.

Therefore, after the fourth switch transistor M4 is turned on, the first power supply signal provided by the second electronic device 40 is transmitted to the Vbus pin in the first USB port 307 sequentially through the fourth switch transistor M4 and the Vbus pin in the second USB port 402, that is, the second electronic device 40 provides the first power supply signal for the first USB port 307 through the second USB port 402.

It should be noted that, the first switch transistor M1 may be referred to as a Sink transistor (a powered party), is cut off when the first USB port 307 is in the DFP mode, and is turned on when the first USB port 307 is in the UFP mode. The second switch transistor M2 is referred to as a Source transistor (a power supply party), is turned on when the first USB port 307 is in the DFP mode, and is cut off when the second USB port 307 is in the UFP mode. The third switch transistor M3 may also be referred to as a Sink transistor, is cut off when the second USB port 402 is in the DFP mode, and is turned on when the second USB port 402 is in the UFP mode. The fourth switch transistor M4 may also be referred to as a Source transistor, is turned on when the second USB port 402 is in the DFP mode, and is cut off when the second USB port 402 is in the UFP mode.

In addition, the first USB port 307 and the second USB port 402 are connected by using the charging cable 50, so that the Vbus pin in the first USB port 307 is connected to the Vbus pin in the second USB port 402, and the GND pin in the first USB port 307 is also connected to the GND pin in the second USB port 402.

The first switch transistor M1 may be an N-type transistor, is turned on when a high-level signal is input to the gate, and is cut off when a low-level signal is input to the gate. Alternatively, the first switch transistor M1 may be a P-type transistor, is turned on when a low-level signal is input to the gate, and is cut off when a high-level signal is input to the gate. Similarly, the second switch transistor M2 may be an N-type transistor or a P-type transistor, the third switch transistor M3 may also be an N-type transistor or a P-type transistor, and the fourth switch transistor M4 may also be an N-type transistor or a P-type transistor.

Certainly, it may be understood that, the CC connection line in the charging cable 50 may alternatively connect the CC1 pin in the first USB port 307 to the CC2 pin in the second USB port 402, or connect the CC2 pin in the first USB port 307 to the CC1 pin in the second USB port 402, or connect the CC2 pin in the first USB port 307 to the CC2 pin in the second USB port 402. A detection process is similar to the foregoing process. To avoid repetition, details are not described herein again.

S604: The first USB port transmits the first power supply signal to a voltage conversion module, and the voltage conversion module performs voltage conversion on the first power supply signal, and sends, to the charging management chip, a second power supply signal obtained after voltage conversion, to wake up the charging management chip.

When the first switch transistor M1 is turned on, the first power supply signal transmitted to the Vbus pin in the first USB port 307 is transmitted to the voltage conversion module 308 by using the first switch transistor M1, so that the first USB port 307 transmits the first power supply signal to the voltage conversion module 308.

After the first USB port 307 sends the first power supply signal to the voltage conversion module 308, the voltage conversion module 308 performs voltage conversion on the first power supply signal to generate the second power supply signal. Then the voltage conversion module 308 transmits the second power supply signal to the charging management chip 302 to power on the charging management chip 302, to wake up the charging management chip 302.

The charging management chip 302 actually has a voltage threshold. When a voltage value of an electrical signal input to the charging management chip 302 reaches the voltage threshold, the charging management chip 302 can be woken up. Therefore, the voltage conversion module 308 needs to be disposed between the first USB port 307 and the charging management chip 302, and the voltage conversion module 308 performs voltage conversion on the first power supply signal, so that a voltage value of the second power supply signal obtained after conversion can reach the voltage threshold. The voltage conversion module 308 is a boost circuit. Certainly, in some embodiments, the voltage conversion module 308 may alternatively be a buck circuit.

For example, when the first power supply signal provided by the second electronic device 40 is actually an electrical signal whose voltage value is 5 V, and the voltage threshold of the charging management chip 302 is 9 V, the voltage conversion module 308 boosts the first power supply signal of 5 V to 9 V. and transmits, to the charging management chip 302, the second power supply signal of 9 V obtained after boosting, to wake up the charging management chip 302.

Certainly, it may be understood that the voltage threshold of the charging management chip 302 may alternatively be equal to the voltage value of the first power supply signal. Therefore, the voltage conversion module 308 does not need to be disposed between the first USB port 307 and the charging management chip 302. The first PD chip 306 directly transmits the first power supply signal to the charging management chip 302, to wake up the charging management chip 302.

S605: The charging management chip generates a wake-up signal based on the second power supply signal.

In some embodiments, a working voltage of the embedded controller 304 may be less than a voltage of the second power supply signal. Therefore, after the charging management chip 302 is woken up, the charging management chip 302 first determines whether the first electronic device 30 is in the power-off state. When determining that the first electronic device 30 is in the power-off state, the charging management chip 302 bucks the second power supply signal by using an internally disposed buck circuit, to generate the wake-up signal. In other words, the wake-up signal is generated after the charging management chip 302 bucks the second power supply signal, the second power supply signal is generated after voltage conversion is performed on the first power supply signal, and the wake-up signal is used to wake up the embedded controller 304.

Alternatively, in some embodiments, the charging management chip 302 is further directly connected to the first USB port 307, and the first USB port 307 directly transmits the first power supply signal to the charging management chip 302. Therefore, after the charging management chip 302 is woken up by the first power supply signal, when the charging management chip 302 determines that the first electronic device 30 is in the power-off state, the charging management chip 302 bucks the first power supply signal by using an internally disposed buck circuit, to generate the wake-up signal.

However, when determining that the first electronic device 30 is in a power-on state, the charging management chip 302 does not buck the second power supply signal or the first power supply signal to generate the wake-up signal.

For example, the voltage of the second power supply signal is 9 V, and the working voltage of the embedded controller is 3 V. Therefore, the charging management chip 302 needs to buck the second power supply signal whose voltage is 9 V, to generate a wake-up signal whose voltage is 3 V.

It should be noted that, in some other embodiments, the working voltage of the embedded controller 304 may be greater than the voltage of the second power supply signal. Therefore, after the charging management chip 302 is woken up, the charging management chip 302 boosts the second power supply signal to generate the wake-up signal. In other words, the wake-up signal is generated after the charging management chip 302 boosts the second power supply signal, and the wake-up signal is used to wake up the embedded controller 304.

Alternatively, the working voltage of the embedded controller 304 may be equal to the voltage of the second power supply signal. Therefore, the charging management chip 302 does not need to buck the second power supply signal, and after being woken up, the charging management chip 302 can directly use the second power supply signal as the wake-up signal.

S606: The charging management chip sends the wake-up signal to the embedded controller, to wake up the embedded controller.

After the charging management chip 302 generates the wake-up signal the charging management chip 302 sends the wake-up signal to the embedded controller 304, and powers on the embedded controller 304 based on the wake-up signal, to wake up the embedded controller 304.

Specifically, after the embedded controller 304 receives the wake-up signal sent by the charging management chip 302, power-on initialization needs to be performed. The power-on initialization includes initializing a bus connected between the embedded controller 304 and another component, for example, initializing a connection bus smbus between the embedded controller 304 and the first PD chip 306.

S607: When the embedded controller is woken up, the embedded controller sends device information query signaling to a first PD chip.

When the embedded controller 304 is woken up, the embedded controller 304 runs control code logic corresponding to the embedded controller 304, and sends the device information query signaling to the first PD chip 306. The device information query signaling is used to query device information of the second electronic device 40, for example, a power supply voltage and a power supply current of the second electronic device 40.

S608: The first PD chip sends the device information query signaling to a second PD chip.

When the first USB port 307 and the second USB port 402 are connected by using the charging cable 50, the first PD chip 306 is connected to the second PD chip 401 based on a connection between the CC pin in the first USB port 307 and the CC pin in the second USB port 402. For example, the CC1 pin in the first USB port 307 is connected to the CC1 pin in the second USB port 402, so that the first PD chip 306 is connected to the second PD chip 401.

After the first PD chip 306 receives the device information query signaling sent by the embedded controller 304, the first PD chip 306 sends the device information query signaling to the second PD chip 401 successively through the CC1 pin in the first USB port 307 and the CC1 pin in the second USB port 402.

S609: The first PD chip receives device information returned by the second PD chip, where the device information includes a power supply voltage and a power supply current.

After receiving the device information query signaling sent by the first PD chip, the second PD chip 401 obtains the device information of the second electronic device 40 based on the device information query signaling. The device information may include the power supply voltage and the power supply current of the second electronic device 40.

Then, the second PD chip 401 sends the obtained device information of the second electronic device 40 to the first PD chip 306 successively through the CC1 pin in the second USB port 402 and the CC1 pin in the first USB port 307, so that the first PD chip 306 can receive the device information returned by the second PD chip 401.

S610: The first PD chip sends the device information to the embedded controller.

Figure 8:
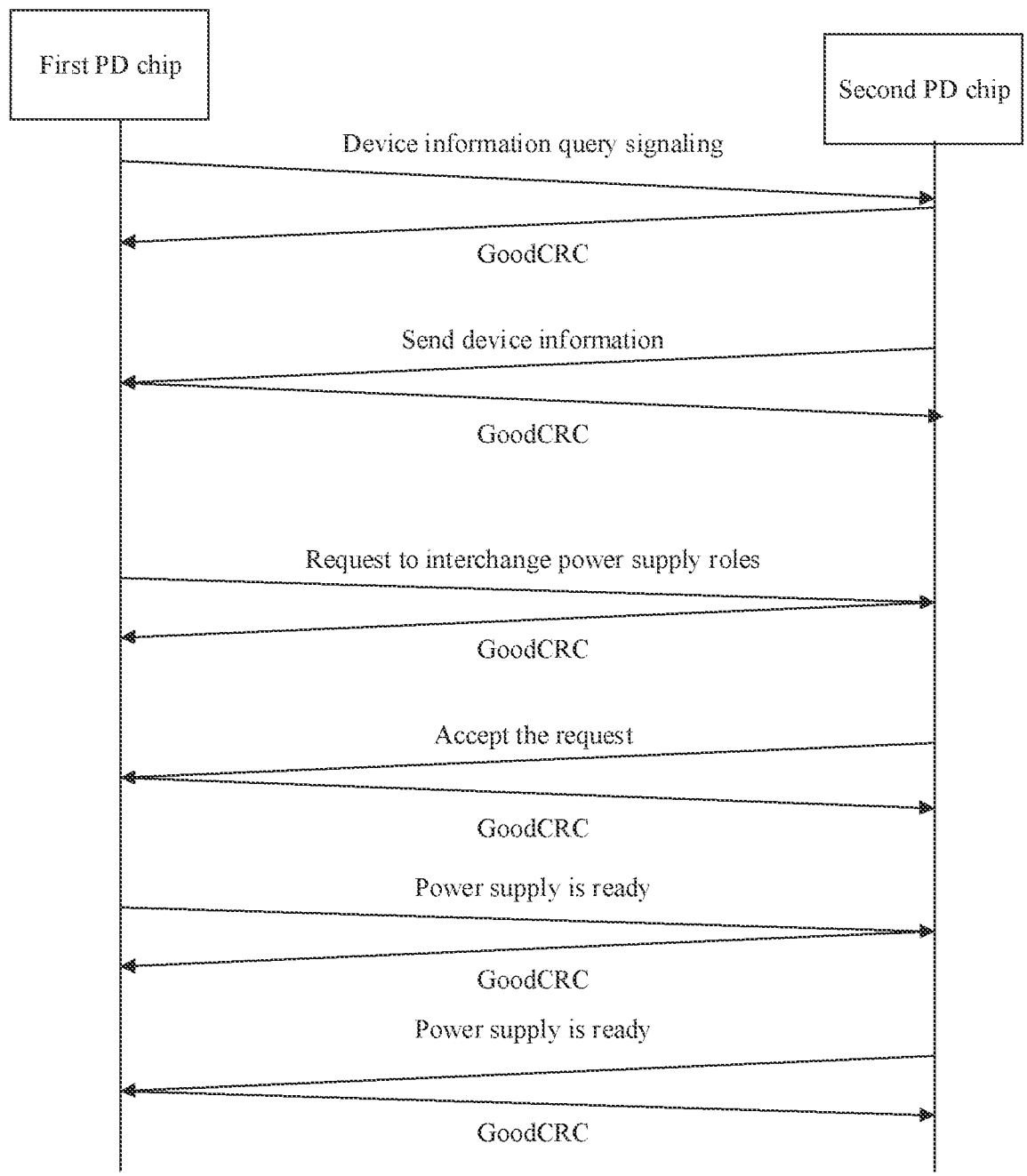
FIG. 8 is a schematic diagram of signaling interaction between a first PD chip and a second PD chip according to an embodiment of this application.

It can be learned that a specific process in which the first PD chip 306 obtains the device information of the second electronic device 40 from the second PD chip 401 is shown in FIG. 8 and FIG. 9. To be specific, in S608, the first PD chip 306 sends the device information query signaling to the second PD chip 401, where a message type corresponding to the device information query signaling is Control: Get Sink_Cap, and the device information query signaling is used by the first PD chip 306 to request to obtain a power supply capability supported by the second electronic device 40. After receiving the device information query signaling, the second PD chip 401 returns response signaling to the first PD chip 306, where a message type corresponding to the response signaling is Control:GoodCRC, and the response signaling is used to indicate that the second PD chip 401 has received a data packet corresponding to the device information query signaling sent by the first PD chip 306, and that the data packet has passed integrity check. Then, the second PD chip 401 returns the device information found based on the device information query signaling to the first PD chip 306, where a message type corresponding to the device information is Data:Sink Capability, and the device information includes the power supply voltage and the power supply current. After receiving the device information, the first PD chip 306 returns response signaling to the second PD chip 401, where a message type corresponding to the response signaling is Control:GoodCRC, and the response signaling is used to indicate that the first PD chip 306 has received a data packet corresponding to the device information sent by the second PD chip 401, and that the data packet has passed integrity check.

S611: The embedded controller calculates a product of the power supply voltage and the power supply current to obtain power supply power of the second electronic device.

After the first PD chip 306 receives the device information returned by the second PD chip 401, the first PD chip 306 sends the device information to the embedded controller 304, where the device information includes the power supply voltage and the power supply current of the second electronic device 40. Then, the embedded controller 304 calculates the product of the power supply voltage and the power supply current, to obtain the power supply power of the second electronic device 40.

For example, if the power supply voltage of the second electronic device 40 is 5 V. and the power supply current of the second electronic device 40 is 3 A, the embedded controller 304 calculates the product of the power supply voltage and the power supply current, to obtain the power supply power of 15 W of the second electronic device.

S612: The embedded controller determines a device type of the second electronic device based on the power supply power.

The embedded controller 304 compares the calculated power supply power with preset power to determine the device type of the second electronic device 40.

Specifically, when the power supply power is less than or equal to the preset power, the embedded controller 304 determines that the device type of the second electronic device 40 is a to-be-charged device: and when the power supply power is greater than the preset power, the embedded controller 304 determines that the device type of the second electronic device 40 is a power supply device.

For example, the preset power may be 15 W. Assuming that the calculated power supply power of the second electronic device 40 is 15 W, it may be determined that the device type of the second electronic device 40 is a to-be-charged device, for example, the second electronic device 40 is a to-be-charged device such as a mobile phone, a wearable device, or a tablet computer. Assuming that the calculated power supply power of the second electronic device 40 is 20 W, it may be determined that the device type of the second electronic device 40 is a power supply device, for example, the second electronic device 40 is a power supply device such as a power bank or an adapter.

Certainly, it may be understood that the preset power is not limited to 15 W, and may be set based on specific power supply power of a to-be-charged device. For example, the preset power may be 10 W or the like.

It may be understood that, in this embodiment of this application, the device type of the second electronic device 40 is unnecessarily determined only by using the power supply power, and the device type of the second electronic device 40 may alternatively be determined by using the power supply current or the power supply voltage.

In one case, the device type of the second electronic device 40 may be determined by using the power supply voltage. In this case, the device information that is returned by the second PD chip 401 and that is received by the first PD chip 306 in S609 includes the power supply voltage, and the device information sent by the first PD chip 306 to the embedded controller 304 in S610 also includes the power supply voltage. The embedded controller 304 directly compares the power supply voltage with a preset voltage to determine the device type of the second electronic device 40.

Specifically, when the power supply voltage is less than or equal to the preset voltage, the embedded controller 304 determines that the device type of the second electronic device 40 is a to-be-charged device: and when the power supply voltage is greater than the preset voltage, the embedded controller 304 determines that the device type of the second electronic device 40 is a power supply device.

For example, the preset voltage is 5 V. Assuming that the power supply voltage obtained from the second PD chip 401 is 3 V, it may be determined that the device type of the second electronic device 40 is a to-be-charged device. Assuming that the power supply voltage obtained from the second PD chip 401 is 9 V, it may be determined that the device type of the second electronic device 40 is a power supply device.

In another case, the device type of the second electronic device 40 may be determined by using the power supply current. In this case, the device information that is returned by the second PD chip 401 and that is received by the first PD chip 306 in S609 includes the power supply current, and the device information sent by the first PD chip 306 to the embedded controller 304 in S610 also includes the power supply current. The embedded controller 304 directly compares the power supply current with a preset current to determine the device type of the second electronic device 40.

Specifically, when the power supply current is less than or equal to the preset current, the embedded controller 304 determines that the device type of the second electronic device 40 is a to-be-charged device: and when the power supply current is greater than the preset current, the embedded controller 304 determines that the device type of the second electronic device 40 is a power supply device.

For example, the preset voltage is 2 A. Assuming that the power supply current obtained from the second PD chip 401 is 1 A, it may be determined that the device type of the second electronic device 40 is a to-be-charged device. Assuming that the power supply current obtained from the second PD chip 401 is 3 A, it may be determined that the device type of the second electronic device 40 is a power supply device.

S613: When the device type of the second electronic device is a to-be-charged device, the embedded controller obtains a first power value of a first battery.

When the embedded controller 304 determines that the device type of the second electronic device 40 is a to-be-charged device, the embedded controller 304 directly obtains the remaining first power value of the first battery 303 from the first battery 303.

It should be noted that a sequence of the process of determining the power supply power of the second electronic device 40 and the process of obtaining the first power value of the first battery 303 in this embodiment of this application may be interchanged. For example, S607 to S612 may be performed first, and S613 is performed only when it is determined that the device type of the second electronic device is a to-be-charged device. Alternatively, S613 may be directly performed after S607 is performed, and subsequently, the embedded controller performs S611 and S612.

S614: When the first power value is greater than a preset power value, the embedded controller sends power supply role switching signaling to the first PD chip.

After obtaining the first power value of the first battery 303, the embedded controller 304 compares the first power value with the preset power value. When determining that the first power value is greater than the preset power value, the embedded controller 304 sends the power supply role switching signaling to the first PD chip 306, where the power supply role switching signaling is used to switch power supply roles of the first electronic device 30 and the second electronic device 40.

For example, the preset power value is 10%. If the obtained first power value of the first battery 303 is 30%, the embedded controller 304 may send the power supply role switching signaling to the first PD chip 306. Certainly, it may be understood that, the preset power value is not limited to 10%, and may alternatively be set to another value. For example, the preset power value may be set to 1%, 15%, 20%, or the like.

S615: The first PD chip sends a power supply role switching request to the second PD chip.

After the first PD chip 306 receives the power supply role switching signaling sent by the embedded controller 304, the first PD chip 306 generates the power supply role switching request based on the power supply role switching signaling. Then, the first PD chip 306 sends the power supply role switching request to the second PD chip 401 successively through the CC1 pin in the first USB port 307 and the CC1 pin in the second USB port 402.

S616: The first PD chip receives response information returned by the second PD chip based on the power supply role switching request, where the response information indicates that the second electronic device agrees to switch a power supply role.

The second PD chip 401 generates the response information based on the power supply role switching request sent by the first PD chip 306, and sends the response information to the first PD chip 306 successively through the CC1 pin in the second USB port 402 and the CC1 pin in the first USB port 307, so that the first PD chip 306 can receive the response information returned by the second PD chip 401.

When the response information indicates that the second electronic device 40 agrees to switch a power supply role, subsequent S617 and S618 are performed. However, when the response information indicates that the second electronic device 40 does not agree to switch a power supply role, the subsequent steps provided in this embodiment of this application do not need to be performed, and the first PD chip 306 can directly control the power supply path between the first USB port 307 and the second USB port 402 to be disconnected. For example, the first PD chip 306 may send a control instruction to the first interface controller 315, so that the first interface controller 315 controls the first switch transistor M1 to be cut off, and a power supply signal provided by the second PD chip 401 is no longer input to the first PD chip 306, to save power of a battery in the second electronic device 40.

Therefore, a signaling interaction process in which the first PD chip 306 and the second PD chip 401 switch a power supply role is shown in FIG. 8 and FIG. 10. To be specific, in S615, the first PD chip 306 sends the power supply role switching request to the second PD chip 401, where a message type corresponding to the power supply role switching request is Control:PR_Swap, and the power supply role switching request is used by the first PD chip 306 to request to interchange power supply roles. After receiving the power supply role switching request, the second PD chip 401 returns response signaling to the first PD chip 306, where a message type corresponding to the response signaling is Control:GoodCRC, and the response signaling is used to indicate that the second PD chip 401 has received a data packet corresponding to the power supply role switching request sent by the first PD chip 306, and that the data packet has passed integrity check. Then, if the second PD chip 401 agrees to switch a power supply role, the second PD chip 401 sends, to the first PD chip 306, a message indicating that the second PD chip 401 agrees to switch a power supply role, where a message type corresponding to the message is Control:Accept, which indicates that the second PD chip 401 accepts the power supply role switching request. After receiving the message that is sent by the second PD chip 401 and that indicates that the second PD chip 401 agrees to switch a power supply role, the first PD chip 306 returns response signaling to the second PD chip 401, where a message type corresponding to the response signaling is Control:GoodCRC, and the response signaling is used to indicate that the first PD chip 306 has received the message that is sent by the second PD chip 401 and that indicates that the second PD chip 401 agrees to switch a power supply role.

Then, the first PD chip 306 further sends, to the second PD chip 401, a message indicating that a power supply is ready, where a message type corresponding to the message is Control:PS_Ready, which indicates that the first electronic device 30 can supply power to the second electronic device 40. After receiving the message that is sent by the first PD chip 306 and that indicates that the power supply is ready, the second PD chip 401 returns response signaling to the first PD chip 306, where a message type corresponding to the response signaling is Control:GoodCRC, and the response signaling is used to indicate that the second PD chip 401 has received the message that is sent by the first PD chip 306 and that indicates that the power supply is ready. Then, the second PD chip 401 sends, to the first PD chip 306, a message indicating that a power supply is ready, where a message type corresponding to the message is Control: PS_Ready, which indicates that the second electronic device 40 can receive a power supply signal sent by the first electronic device 30. After receiving the message that is sent by the second PD chip 401 and that indicates that the power supply is ready, the first PD chip 306 returns response signaling to the second PD chip 401, where a message type corresponding to the response signaling is Control: GoodCRC, and the response signaling is used to indicate that the first PD chip 306 has received the message that is sent by the second PD chip 401 and that indicates that the power supply is ready.

S617: The second PD chip switches a power supply role of the second electronic device to a powered device.

After the second PD chip 401 sends, to the first PD chip 306, the response information indicating that the second PD chip 401 agrees to switch a power supply role, or after the second PD chip 401 sends, to the first PD chip 306, the message indicating that the power supply is ready, the second PD chip 401 switches the power supply role of the second electronic device 40 from a power supply device to a powered device.

Figure 11:
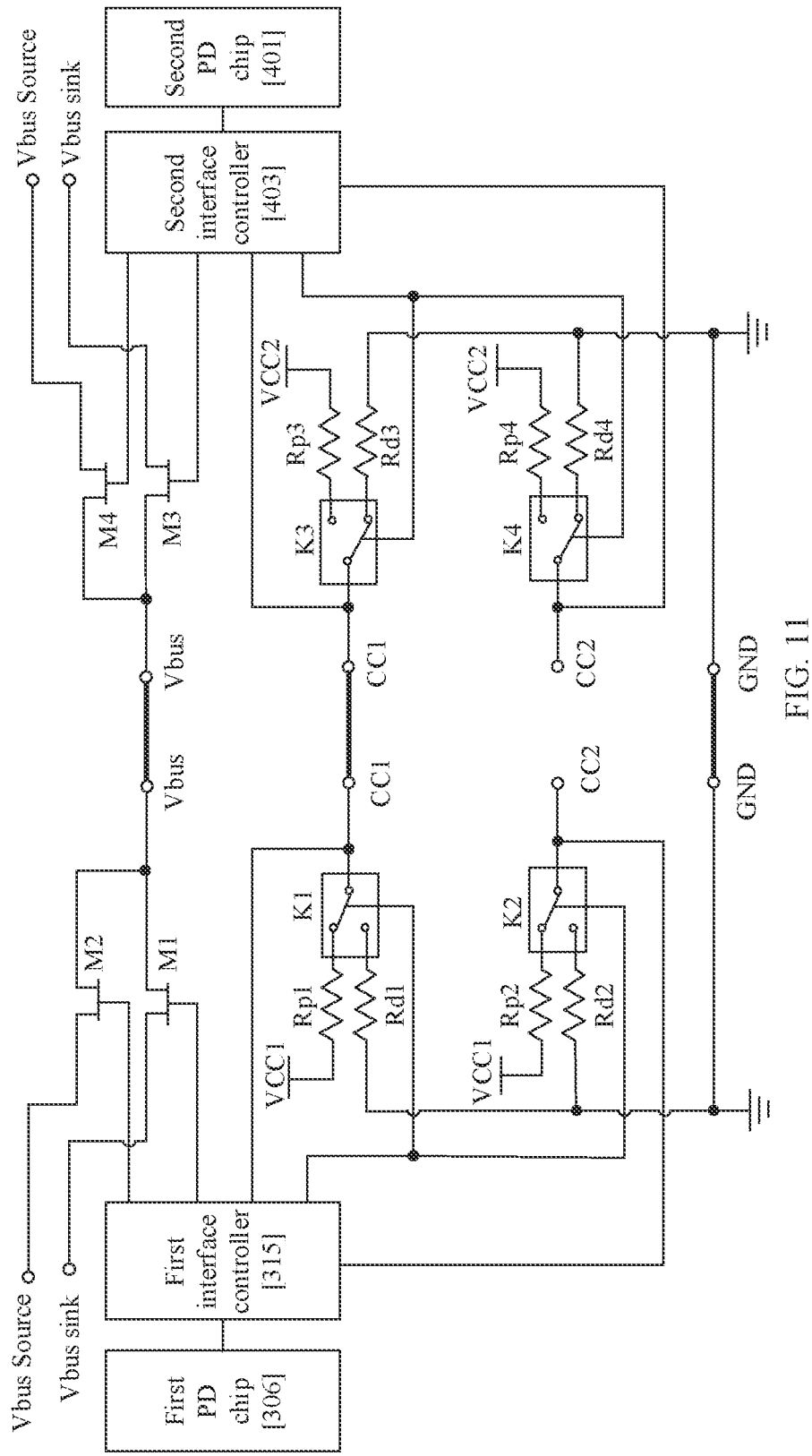
FIG. 11 is a schematic diagram of a connection when a first electronic device is a power supply device and a second electronic device is a powered device according to an embodiment of this application.

Specifically, as shown in FIG. 11, the second PD chip 401 may send a control signal to the second interface controller 403, so that the second interface controller 403 controls the third switch K3 to connect the CC1 pin in the second USB port 402 to the third pull-down resistor Rd3, and controls the fourth switch K4 to connect the CC2 pin in the second USB port 402 to the fourth pull-down resistor Rd4. In addition, the second interface controller 403 controls the third switch transistor M3 to be turned on, and controls the fourth switch transistor M4 to be cut off. Based on the foregoing control manner, the working mode of the second USB port 402 is switched from the DFP mode to the UFP mode, so that the power supply role of the second electronic device 40 is switched from a power supply device to a powered device.

S618: The first PD chip switches a power supply role of the first electronic device to a power supply device, so that a charging path formed by the first battery, the charging management chip, and the first USB port is conducted.

After the first PD chip 306 receives the response information that is returned by the second PD chip 401 and that indicates that the second PD chip 401 agrees to switch a power supply role, or after the first PD chip 306 receives the message that is sent by the second PD chip 401 and that indicates that the power supply is ready, the first PD chip 306 switches the power supply role of the first electronic device 30 from a powered device to a power supply device.

Specifically, as shown in FIG. 11, the first PD chip 306 may send a control signal to the first interface controller 315, so that the first interface controller 315 controls the first switch K1 to connect the CC1 pin in the first USB port 307 to the first pull-up resistor Rp1, and controls the second switch K2 to connect the CC2 pin in the first USB port 307 to the second pull-up resistor Rp2. In addition, the first interface controller 315 controls the second switch transistor M2 to be turned on, and controls the first switch transistor M1 to be cut off. Based on the foregoing control manner, the working mode of the first USB port 307 is switched from the UFP mode to the DFP mode, so that the power supply role of the first electronic device 30 is switched from a powered device to a power supply device.

In the first electronic device 30 shown in FIG. 3, a charging path between the first battery 303, the charging management chip 302, and the voltage conversion module 308 is always in a conducted state, and when the power supply role of the first electronic device 30 is switched from a powered device to a power supply device, a charging path between the voltage conversion module 308, the second switch transistor M2, and the Vbus pin in the first USB port 307 shown in FIG. 11 is also in a conducted state. Therefore, a charging path formed by the first battery 303, the charging management chip 302, the voltage conversion module 308, and the first USB port 307 is conducted, and a power supply signal provided by the first battery 303 may be input to the second USB port 402 of the second electronic device 40 successively through the charging management chip 302, the voltage conversion module 308, and the first USB port 307.

In addition, when the power supply role of the second electronic device 40 is switched from a power supply device to a powered device, a path between the Vbus pin in the second USB port 402, the third switch transistor M3, and the charging management chip (located in the second electronic device 40) shown in FIG. 11 is also in a conducted state, and the charging management chip in the second electronic device 40 is further connected to the second battery in the second electronic device 40, so that a power supply signal that is input by the first electronic device 30 to the second USB port 402 of the second electronic device 40 can be input to the second battery successively through the third switch transistor M3 and the charging management chip in the second electronic device 40, and the first battery 303 in the first electronic device 30 charges the second battery in the second electronic device 40.

Therefore, the charging control method shown in FIG. 6A and FIG. 6B may be directly based on hardware circuit control. When the power supply role of the first electronic device 30 is switched to a power supply device, the charging path formed by the first battery 303, the charging management chip 302, the voltage conversion module 308, and the first USB port 307 is conducted, so that the first battery 303 in the first electronic device 30 charges the second battery in the second electronic device 40. Response time of the first battery 303 is short, and the first electronic device 30 can perform reverse charging on the second electronic device 40 through quick switching.

It should be noted that, because a voltage of a power supply signal provided by the first battery 303 in the first electronic device 30 is large, after the power supply signal provided by the first battery 303 passes through the charging management chip 302, the voltage conversion module 308 bucks the power supply signal, and inputs a bucked power supply signal to the second USB port 402 of the second electronic device 40 through the first USB port 307. For example, the voltage of the power supply signal provided by the first battery 303 is 13 V. The voltage conversion module 308 bucks the power supply signal whose voltage is 13 V, and a voltage of a bucked power supply signal that is output by the voltage conversion module 308 is 5 V.

In conclusion, in this embodiment of this application, when the first electronic device 30 is in the power-off state, the embedded controller 304 is completely powered off, to reduce power consumption of the first battery 303, thereby prolonging a battery life of the first electronic device 30. In addition, when the first USB port 307 of the first electronic device 30 is connected to the second USB port 402 of the second electronic device 40, the second electronic device 40 is used to temporarily supply power to the first electronic device 30, to wake up the embedded controller 304. When the embedded controller 304 detects that the device type of the second electronic device 40 is a to-be-charged device, and the first power value of the first battery 303 is greater than the preset power value, the embedded controller 304 sends the power supply role switching signaling to the first PD chip 306, and controls the first PD chip 306 and the second PD chip 401 to switch a power supply role, so that the embedded controller 304 controls the first battery 303 in the first electronic device 30 to perform reverse charging on the second electronic device 40 such as a mobile phone, a wearable device, or a tablet computer.

Figure 12A:
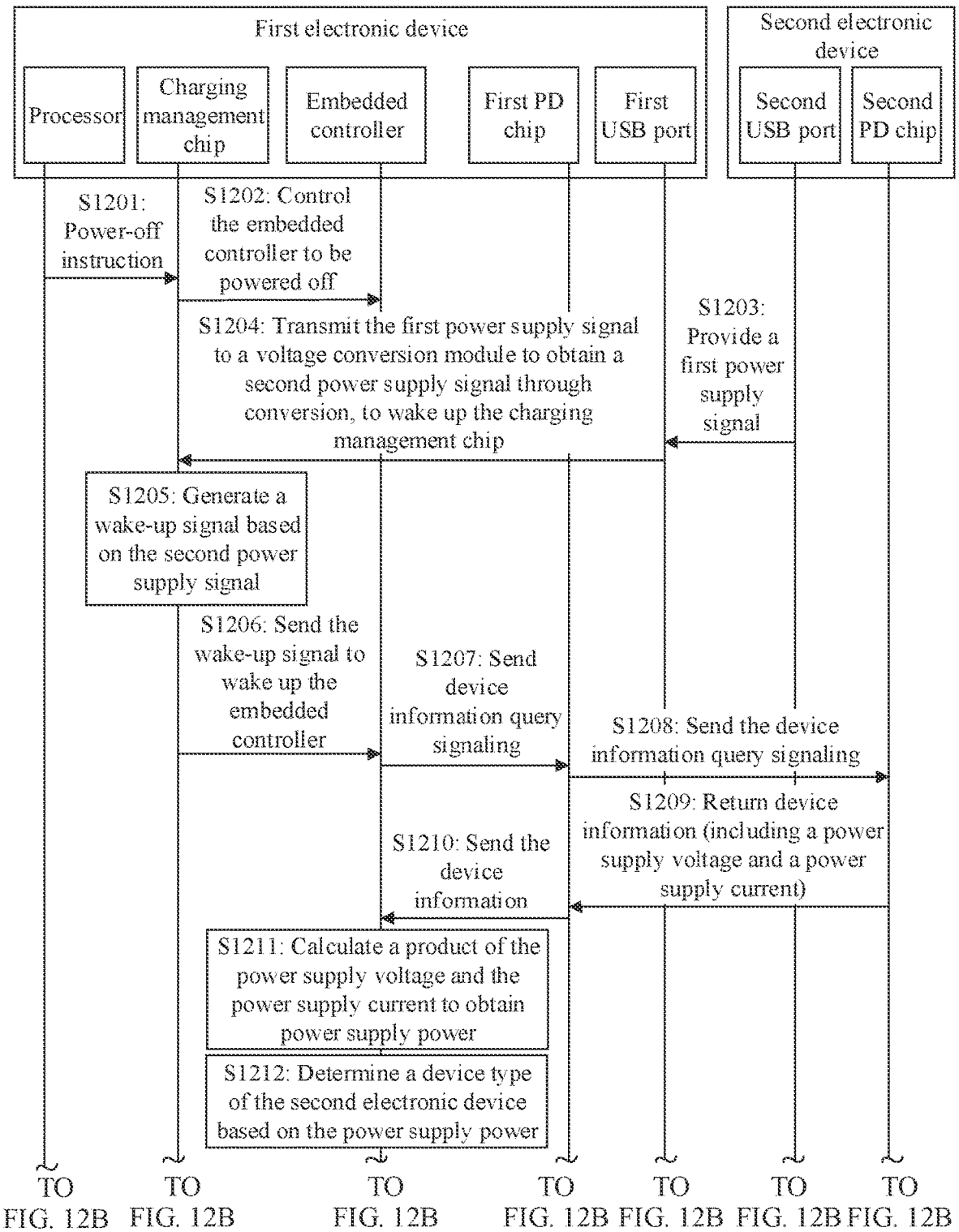
FIG. 12A and FIG. 12B are a flowchart of another charging control method according to an embodiment of this application.
Figure 12B:
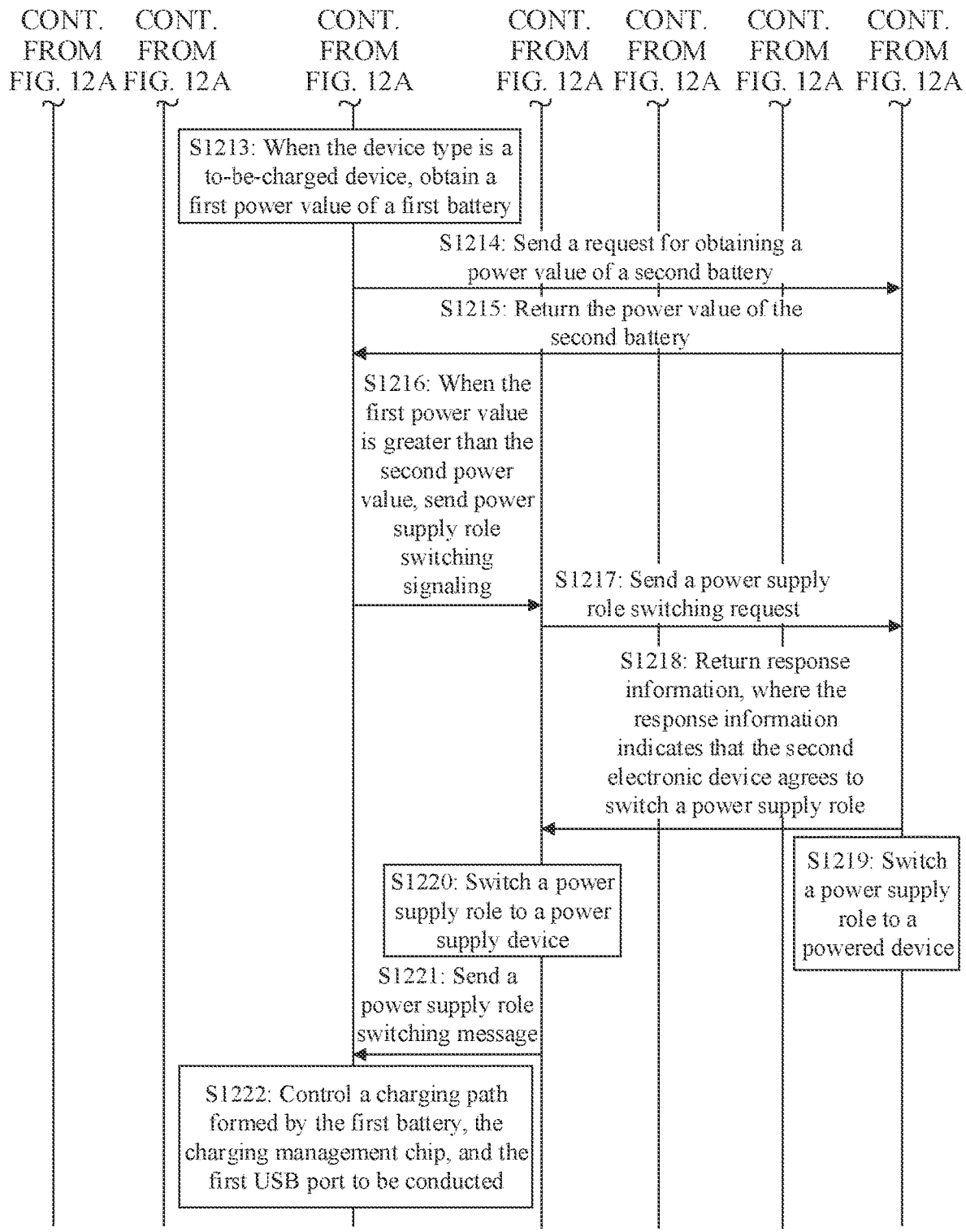

For example, FIG. 12A and FIG. 12B are a flowchart of another charging control method according to an embodiment of this application. Referring to FIG. 12A and FIG. 12B, the charging control method may be applied to the first electronic device 30, and may specifically include the following steps.

S1201: A processor sends a power-off instruction to a charging management chip.

S1202: The charging management chip controls an embedded controller to be powered off.

S1203: When a first electronic device is in a power-off state, and a second USB port of a second electronic device is connected to a first USB port, the second electronic device provides a first power supply signal for the first USB port through the second USB port.

S1204: The first USB port transmits the first power supply signal to a voltage conversion module, and the voltage conversion module performs voltage conversion on the first power supply signal, and sends, to the charging management chip, a second power supply signal obtained after voltage conversion, to wake up the charging management chip.

S1205: The charging management chip generates a wake-up signal based on the second power supply signal.

S1206: The charging management chip sends the wake-up signal to the embedded controller, to wake up the embedded controller.

S1207: When the embedded controller is woken up, the embedded controller sends device information query signaling to a first PD chip.

S1208: The first PD chip sends the device information query signaling to a second PD chip.

S1209: The first PD chip receives device information returned by the second PD chip, where the device information includes a power supply voltage and a power supply current.

S1210: The first PD chip sends the device information to the embedded controller.

S1211: The embedded controller calculates a product of the power supply voltage and the power supply current to obtain power supply power of the second electronic device.

S1212: The embedded controller determines a device type of the second electronic device based on the power supply power.

S1213: When the device type of the second electronic device is a to-be-charged device, the embedded controller obtains a first power value of a first battery.

A specific execution process of S1201 to S1213 shown in FIG. 12A and FIG. 12B is similar to a specific execution process of S601 to S613 shown in FIG. 6A and FIG. 6B. To avoid repetition, details are not described herein again.

S1214: The embedded controller sends a power value obtaining request to the second PD chip by using the first PD chip, where the power value obtaining request is used to obtain a second power value of a second battery in the second electronic device.

Specifically, the embedded controller 304 sends the power value obtaining request to the first PD chip 306, and then the first PD chip 306 sends the power value obtaining request to the second PD chip 401 successively through the CC1 pin in the first USB port 307 and the CC1 pin in the second USB port 402.

S1215: The second PD chip returns, to the embedded controller by using the first PD chip, the second power value that is of the second battery and that is obtained based on the power value obtaining request.

After the second PD chip 401 receives the power value obtaining request sent by the first PD chip 306, the second PD chip 401 obtains the second power value of the second battery in the second electronic device 40 based on the power value obtaining request. Then, the second PD chip 401 sends the second power value of the second battery to the first PD chip 306 successively through the CC1 pin in the second USB port 402 and the CC1 pin in the first USB port 307, and then the first PD chip 306 sends the second power value to the embedded controller 304.

S1216: When the first power value is greater than the second power value, the embedded controller sends power supply role switching signaling to the first PD chip.

After obtaining the first power value of the first battery 303 and the second power value of the second battery, the embedded controller 304 compares the first power value with the second power value. When determining that the first power value is greater than the second power value, the embedded controller 304 sends the power supply role switching signaling to the first PD chip 306, where the power supply role switching signaling is used to switch power supply roles of the first electronic device 30 and the second electronic device 40.

For example, if the first power value is 30%, and the second power value is 10%, the embedded controller 304 may send the power supply role switching signaling to the first PD chip 306.

S1217: The first PD chip sends a power supply role switching request to the second PD chip.

S1218: The first PD chip receives response information returned by the second PD chip based on the power supply role switching request, where the response information indicates that the second electronic device agrees to switch a power supply role.

S1219: The second PD chip switches a power supply role of the second electronic device to a powered device.

A specific execution process of S1217 to S1219 shown in FIG. 12B is similar to a specific execution process of S615 to S617 shown in FIG. 6B. To avoid repetition, details are not described herein again.

S1220: The first PD chip switches a power supply role of the first electronic device to a power supply device.

After the first PD chip 306 receives the response information that is returned by the 30 second PD chip 401 and that indicates that the second PD chip 401 agrees to switch a power supply role, or after the first PD chip 306 receives the message that is sent by the second PD chip 401 and that indicates that the power supply is ready, the first PD chip 306 switches the power supply role of the first electronic device 30 from a powered device to a power supply device.

S1221: The first PD chip sends a power supply role switching message to the embedded controller, where the power supply role switching message indicates that the power supply role of the first electronic device has been switched to a power supply device.

After switching the power supply role of the first electronic device 30 from a powered device to a power supply device, the first PD chip 306 generates the power supply role switching message, where the power supply role switching message indicates that the power supply role of the first electronic device 30 has been switched to a power supply device. Then, the first PD chip 306 sends the power supply role switching message to the embedded controller 304, to notify the embedded controller 304 that the power supply role of the first electronic device 30 has been switched to a power supply device.

S1222: The embedded controller controls a charging path formed by the first battery; the charging management chip, and the first USB port to be conducted.

Figure 13:
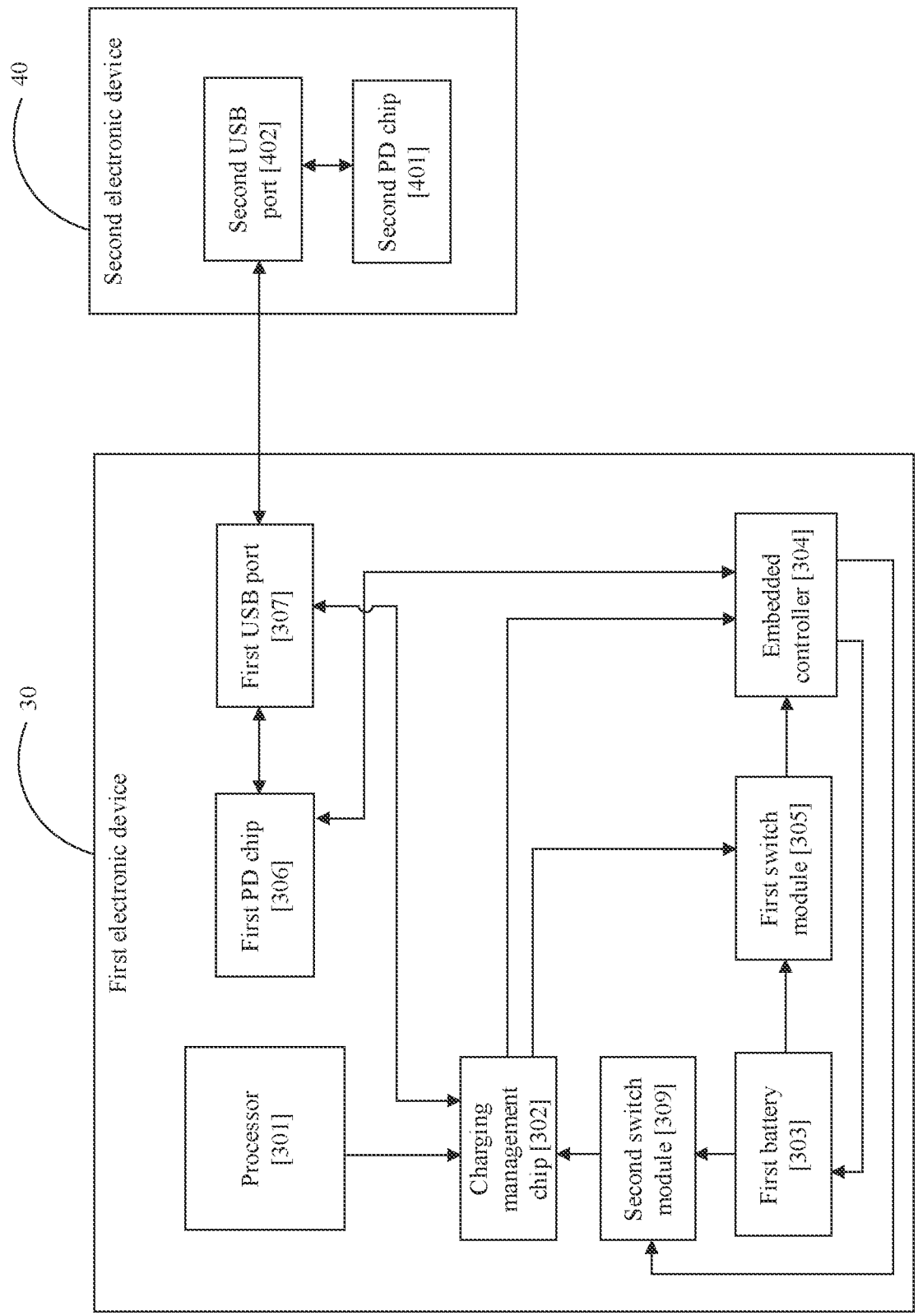
FIG. 13 is another schematic diagram of structures of a first electronic device and a second electronic device according to an embodiment of this application.

As shown in FIG. 13, a second switch module 309 is further connected in series between the first battery 303 and the charging management chip 302. When the second switch module 309 is turned off, the charging path between the first battery 303, the charging management chip 302, and the first USB port 307 is disconnected; and when the second switch module 309 is turned on, the charging path between the first battery 303, the charging management chip 302, and the first USB port 307 is conducted.

In some embodiments, the second switch module 309 may be a switch transistor. A gate of the switch transistor is connected to the embedded controller 304, a source of the switch transistor is connected to the first battery 303, and a drain of the switch transistor is connected to the charging management chip 302. In addition, the switch transistor may be an N-type transistor or a P-type transistor.

It should be noted that, a structure of the first electronic device 30 shown in FIG. 13 is similar to that of the first electronic device 30 shown in FIG. 3, but in the first electronic device 30 shown in FIG. 3, the first battery 303 is directly connected to the charging management chip 302, and in the first electronic device 30 shown in FIG. 13, the first battery 303 is connected to the charging management chip 302 by using the second switch module 309.

It may be understood that a location of the second switch module 309 in this embodiment of this application is not limited between the first battery 303 and the charging management chip 302, provided that the second switch module 309 is disposed in the charging path between the first battery 303, the charging management chip 302, and the first USB port 307. For example, the second switch module 309 is connected in series between the charging management chip 302 and the first USB port 307.

Therefore, when the embedded controller 304 determines that the power supply role of the first electronic device 30 has been switched to a power supply device, the embedded controller 304 controls the second switch module 309 to be turned on, so that the charging path between the first battery 303, the charging management chip 302, and the first USB port 307 is conducted. Therefore, a power supply signal provided by the first battery 303 can be input to the second USB port 402 of the second electronic device 40 successively through the second switch module 309, the charging management chip 302, and the first USB port 307.

In addition, when the power supply role of the second electronic device 40 is switched from a power supply device to a powered device, a path between the Vbus pin in the second USB port 402, the third switch transistor M3, the charging management chip (located in the second electronic device 40), and the second battery shown in FIG. 11 is also in a conducted state, so that a power supply signal that is input by the first electronic device 30 to the second USB port 402 of the second electronic device 40 can be input to the second battery successively through the third switch transistor M3 and the charging management chip in the second electronic device 40, and the first battery 303 in the first electronic device 30 charges the second battery in the second electronic device 40.

In conclusion, in this embodiment of this application, when the first electronic device 30 is in the power-off state, the embedded controller 304 is completely powered off, to reduce power consumption of the first battery 303, thereby prolonging a battery life of the first electronic device 30. In addition, when the first USB port 307 of the first electronic device 30 is connected to the second USB port 402 of the second electronic device 40, the second electronic device 40 is used to temporarily supply power to the first electronic device 30, to wake up the embedded controller 304. When the embedded controller 304 detects that the device type of the second electronic device 40 is a to-be-charged device, and the first power value of the first battery 303 is greater than the second power value of the second battery in the second electronic device 40, the embedded controller 304 sends the power supply role switching signaling to the first PD chip 306, and controls the first PD chip 306 and the second PD chip 401 to switch a power supply role. After the embedded controller 304 receives the power supply role switching message that is from the first PD chip 306 and that indicates that the power supply role of the first electronic device 30 has been switched to a power supply device, the embedded controller further controls the charging path formed by the first battery 303, the charging management chip 302, and the first USB port 307 to be conducted, so that the first battery 303 in the first electronic device 30 performs reverse charging on the second electronic device 40 such as a mobile phone, a wearable device, or a tablet computer.

In addition, in S1222, the embedded controller 304 may further send a control instruction to the charging management chip 302, so that the charging management chip 302 can transmit, to the voltage conversion module 308, the power supply signal provided by the first battery, and then the power supply signal is transmitted to the first USB port 307, to conduct the charging path formed by the first battery 303, the charging management chip 302, and the first USB port 307.

Certainly, in an actual use process, the first power value of the first battery 303 may not be referenced. Provided that the embedded controller 304 determines, based on the device information of the second electronic device 40, that the second electronic device 40 is a to-be-charged device, the embedded controller 304 can directly control the first battery 303 to charge the second electronic device 40.

In addition, when controlling the first battery 303 to charge the second electronic device 40, the embedded controller 304 may further select, with reference to the power supply voltage and the power supply current of the second electronic device 40, different charging modes to charge the second electronic device 40. For example, when the power supply voltage is 5 V and the power supply current is 3 A, a 5V3A charging mode may be selected to charge the second electronic device 40, or a 5V2A charging mode may be selected to charge the second electronic device 40.

Figure 14:
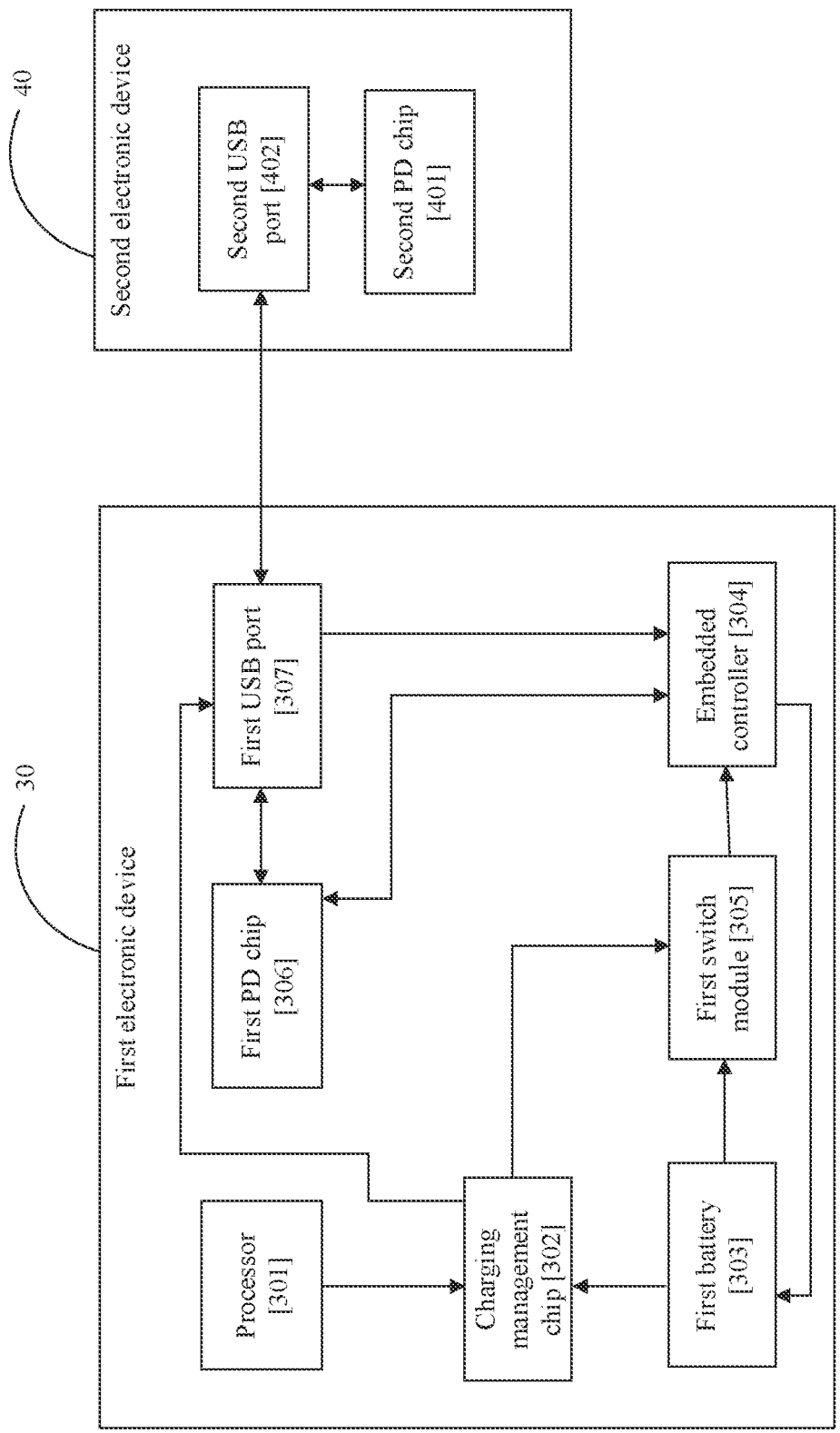
FIG. 14 is still another schematic diagram of structures of a first electronic device and a second electronic device according to an embodiment of this application.

In some embodiments, the embedded controller 304 may be directly woken up by directly using the first power supply signal sent by the first USB port 307, instead of being woken up by using the second power supply signal sent by the charging management chip 302. As shown in FIG. 14, the first USB port 307 is directly connected to the embedded controller 304, and the charging management chip 302 is directly connected to the first USB port 307. Therefore, after receiving the first power supply signal sent by the second electronic device 40, the first USB port 307 directly uses the first power supply signal as the wake-up signal, and sends the wake-up signal to the embedded controller 304, to wake up the embedded controller 304.

Subsequently, in a process in which the first electronic device 30 charges the second electronic device 40, a power supply signal provided by the first battery 303 is directly transmitted to the first USB port 307 through the charging management chip 302.

Figure 15:
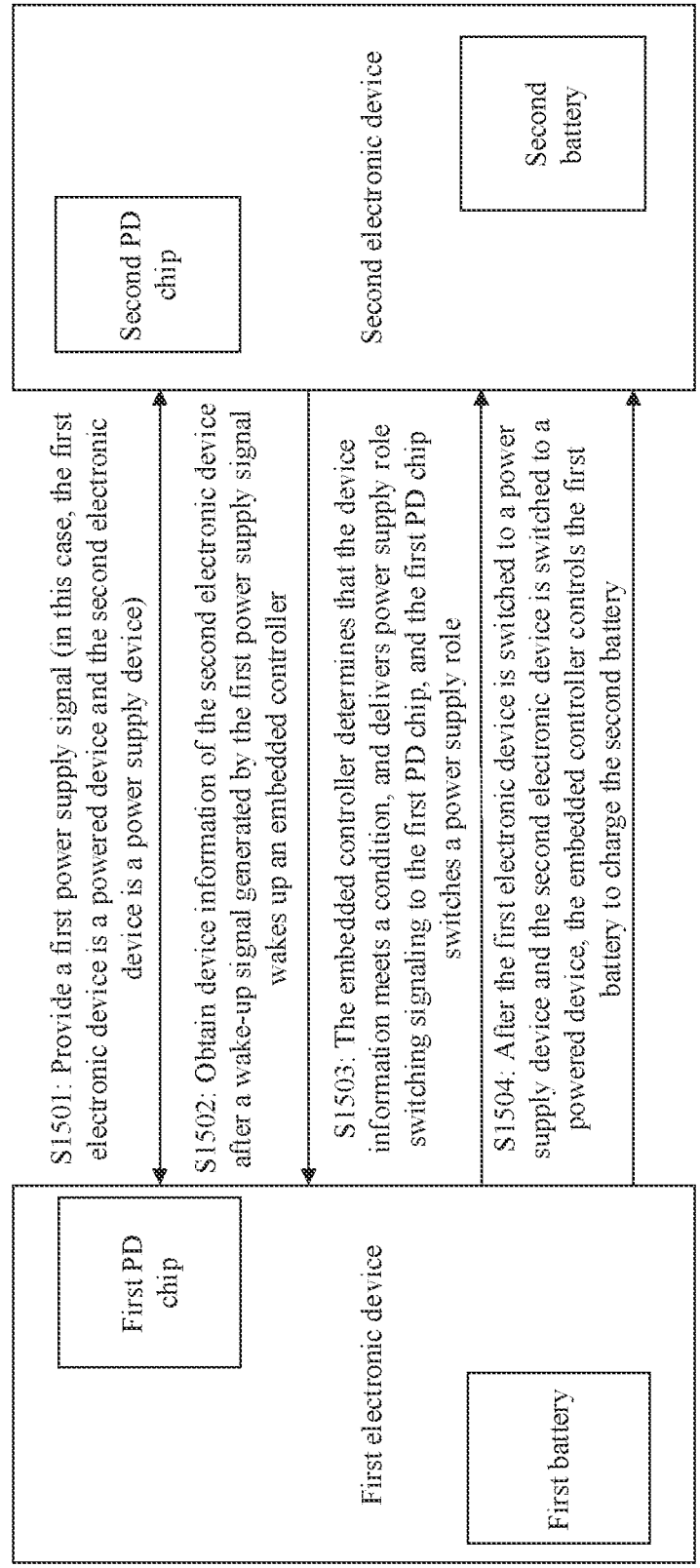
FIG. 15 is a schematic diagram of a process of interaction between a first electronic device and a second electronic device according to an embodiment of this application.

In conclusion, a process of interaction between the first electronic device 30 and the second electronic device 40 in this embodiment of this application may be simplified as that shown in FIG. 15. First, the second electronic device 40 performs S1501 to provide the first power supply signal for the first USB port 307 of the first electronic device 30 (in this case, the first electronic device 30 is a powered device, and the second electronic device 40 is a power supply device). After generating the wake-up signal based on the first power supply signal, the first electronic device 30 wakes up the embedded controller 304. After the embedded controller 304 is woken up, the first electronic device 30 performs S1502 to obtain the device information of the second electronic device 40. The embedded controller 304 in the first electronic device 30 determines, based on the device information, whether the second electronic device 40 meets a condition, that is, determines, based on the device information, whether the second electronic device 40 is a to-be-charged device. When the second electronic device 40 is a to-be-charged device, the embedded controller 304 performs S1503 to deliver the power supply role switching signaling to the first PD chip 306, and the first PD chip 306 switches a power supply role. If the power supply role of the first electronic device 30 is switched to a power supply device, and the power supply role of the second electronic device 40 is switched to a powered device, the embedded controller 304 performs S1504 to control the first battery 303 to charge the second battery in the second electronic device 40.

In this embodiment of this application, further, in a process in which the first battery 303 charges the second electronic device 40, the embedded controller 304 regularly obtains a third power value of the first battery 303. When the third power value does not meet a preset condition, the embedded controller 304 controls the first battery 303 to stop charging the second electronic device 40.

In the process in which the first battery 303 charges the second electronic device 40, the embedded controller 304 obtains the third power value of the first battery 303 once every preset duration. For example, the preset duration may be three minutes, five minutes, or the like. When determining that the third power value is less than or equal to a preset power value or the third power value is less than a current fourth power value of the second battery (that is, a power value of the second battery at a moment of obtaining the third power value), the embedded controller 304 may control the power supply path between the first USB port 307 and the second USB port 402 to be disconnected, so that the first battery 303 stops charging the second electronic device 40.

Specifically, the embedded controller 304 sends a control instruction to the first PD chip 306, so that the first PD chip 306 can control the first interface controller 315 to set the second switch transistor M2 to be in a cut-off state (the first switch transistor M1 is also in a cut-off state). In this case, the power supply signal provided by the first battery 303 is not input to the second electronic device 40, to prevent excessive power consumption of the first battery 303 from affecting normal use of the first electronic device 30.

The foregoing descriptions are all specific to a charging control method used when the first electronic device 30 is in the power-off state, the device type of the second electronic device 40 connected to the first electronic device 30 is a to-be-charged device, and the power value of the first battery 303 in the first electronic device 30 meets the preset condition. In this embodiment of this application, there may be the following several cases: In a first case, the first electronic device 30 may further charge the second electronic device 40 in a power-on state. In a second case, the first electronic device 30 is in the power-off state, and when the device type of the second electronic device 40 connected to the first electronic device 30 is a power supply device, the second electronic device 40 serving as a power supply device charges the first electronic device 30. In a third case, the first electronic device 30 is in the power-off state, the device type of the second electronic device 40 is a to-be-charged device, but the power value of the first battery 303 in the first electronic device 30 does not meet the preset condition. In this case, the power supply path between the first USB port 307 and the second USB port 402 needs to be disconnected.

Figure 16A:
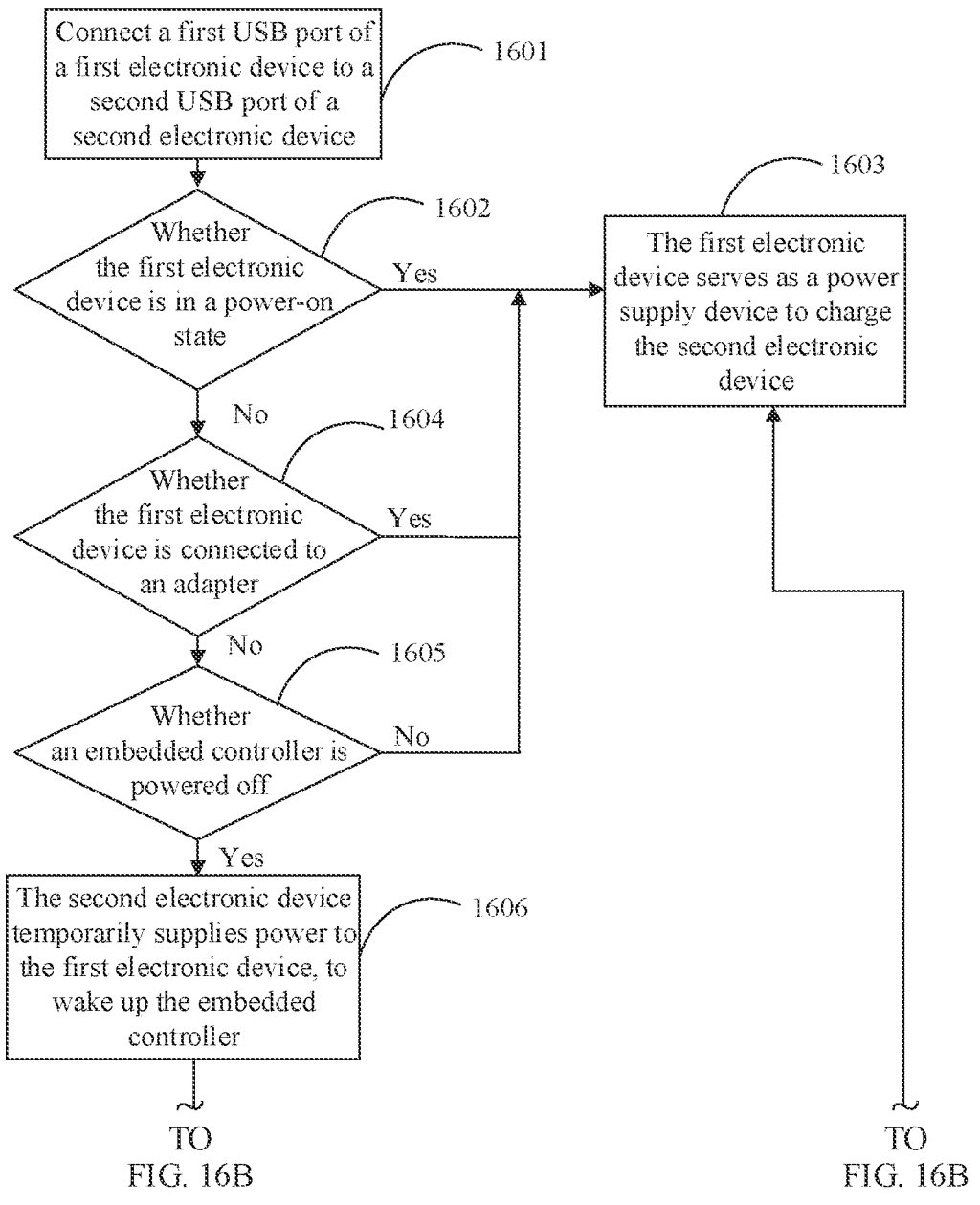
FIG. 16A and FIG. 16B are a schematic diagram of a charging procedure when a first electronic device is in different scenarios according to an embodiment of this application.
Figure 16B:
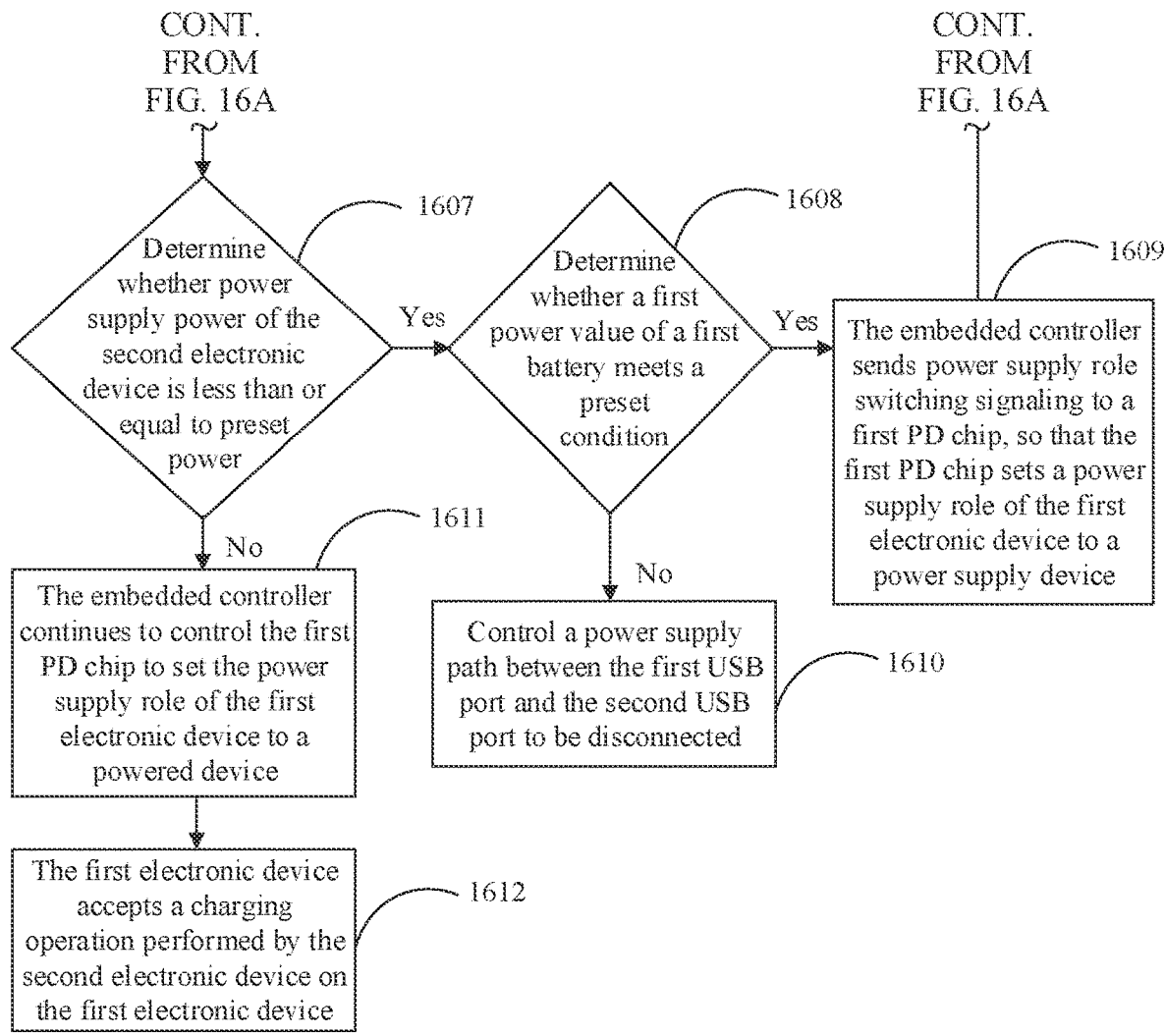

The following describes several charging scenarios in the embodiments of this application with reference to a schematic diagram of a specific charging procedure. FIG. 16A and FIG. 16B are a schematic diagram of a charging procedure when a first electronic device is in different scenarios according to an embodiment of this application. Referring to FIG. 16A and FIG. 16B, the procedure may specifically include the following steps.

S1601: A user connects a first USB port of the first electronic device to a second USB port of a second electronic device.

S1602: Detect whether the first electronic device is in a power-on state.

S1603: When the first electronic device is in the power-on state, the first electronic device serves as a power supply device to charge the second electronic device.

S1604: When the first electronic device is in a power-off state, detect whether the first electronic device is connected to an adapter.

When it is detected that the first electronic device 30 is connected to an adapter, the first electronic device 30 still serves as a power supply device to charge the second electronic device 40.

S1605: When the first electronic device is connected to no adapter, detect whether an embedded controller is powered off.

Generally, when the first electronic device 30 is triggered to perform a power-off operation, there is specific spaced time from starting to perform the power-off operation by the first electronic device 30 to controlling the embedded controller 304 to be powered off, for example, the spaced time is 10 s. Therefore, after the first electronic device 30 performs the power-off operation, it is detected whether the embedded controller 304 is powered off.

When the embedded controller 304 is not powered off, that is, at a moment at which the first USB port 307 is connected to the second USB port 402, within the spaced time from starting to perform the power-off operation by the first electronic device 30 to completing power-off of the embedded controller 304, the first electronic device 30 still serves as a power supply device to charge the second electronic device 40.

S1606: When the embedded controller is powered off, the second electronic device temporarily supplies power to the first electronic device, to wake up the embedded controller.

For a specific execution process of this step, refer to the execution process of S603 to S606. To avoid repetition, details are not described herein again.

S1607: When the embedded controller is woken up, the embedded controller obtains power supply power of the second electronic device, and determines whether the power supply power is less than or equal to preset power.

For a specific execution process of this step, refer to the execution process of S607 to S612. To avoid repetition, details are not described herein again.

S1608: When the power supply power is less than or equal to the preset power, the embedded controller determines whether a first power value of a first battery meets a preset condition.

The preset condition is that the first power value is greater than a preset power value, or the preset condition is that the first power value is greater than a second power value of a second battery in the second electronic device.

S1609: When the first power value of the first battery meets the preset condition, the embedded controller sends power supply role switching signaling to a first PD chip, so that the first PD chip sets a power supply role of the first electronic device to a power supply device.

For a specific execution process of this step, refer to the execution process of S614 to S618, or refer to the execution process of S1216 to S1220. To avoid repetition, details are not described herein again.

When the embedded controller 304 controls the first PD chip 306 to set the power supply role of the first electronic device 30 to a power supply device, the first electronic device 30 charges the second electronic device 40.

S1610: When the first power value of the first battery does not meet the preset condition, the embedded controller controls a power supply path between the first USB port and the second USB port to be disconnected.

To be specific, when a device type of the second electronic device 40 is a to-be-charged device and the first power value of the first battery 303 does not meet the preset condition, the embedded controller 304 controls the power supply path between the first USB port 307 and the second USB port 402 to be disconnected.

Specifically, the embedded controller 304 sends a control instruction to the first PD chip 306, so that the first PD chip 306 can control the first interface controller 315 to set the first switch transistor M1 to be in a cut-off state, and a power supply signal provided by the second PD chip 401 is no longer input to the first PD chip 306, to save power of the battery in the second electronic device 40.

Alternatively, when the first power value of the first battery 303 does not meet the preset condition, the first electronic device 30 may be charged by using the second electronic device 40.

S1611: When the power supply power is greater than the preset power, the embedded controller continues to control the first PD chip to set the power supply role of the first electronic device to a powered device.

S1612: The first electronic device accepts a charging operation performed by the second electronic device on the first electronic device.

To be specific, when the device type of the second electronic device 40 is a power supply device, the embedded controller 304 continues to control the first PD chip 306 to set the power supply role of the first electronic device 30 to a powered device, so that a power supply signal provided by the second electronic device 40 is input to the first battery 303 through the first USB port 307 and the charging management chip 302, that is, the second electronic device 40 charges the first electronic device 30.

The charging control method in the embodiments of this application is described above, and a first electronic device for performing the charging control method provided in the embodiments of this application is described below.

Figure 17:
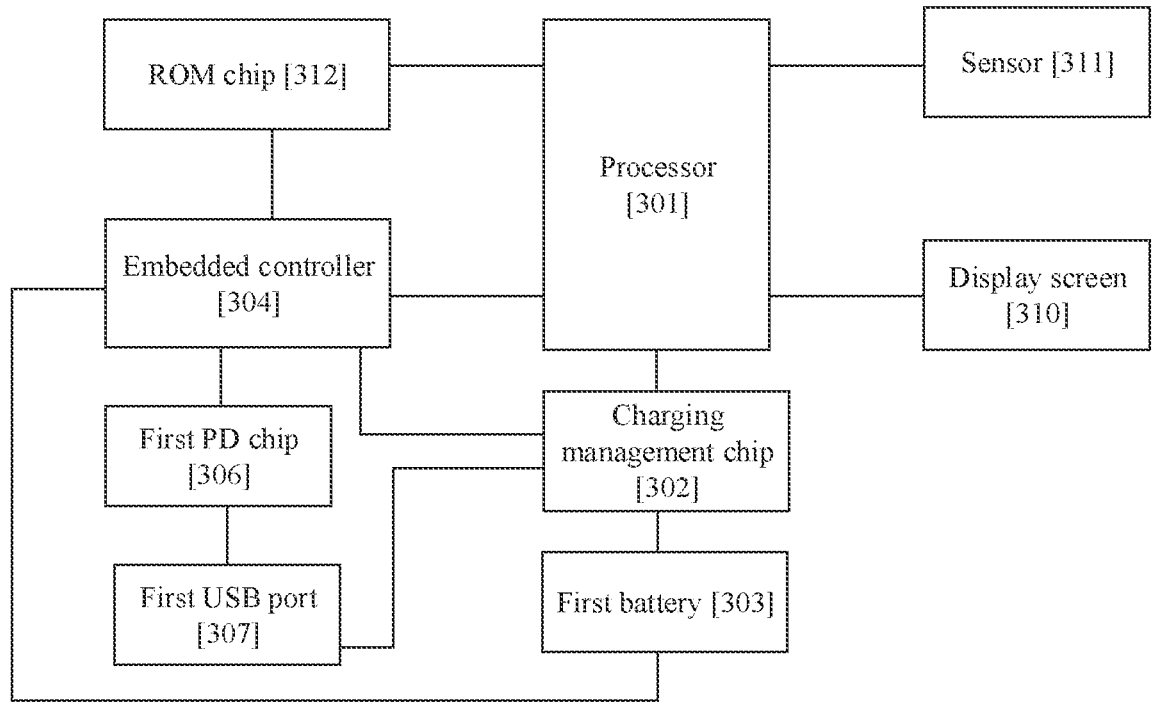
FIG. 17 is a schematic diagram of a circuit connection of a first electronic device according to an embodiment of this application.

FIG. 17 is a schematic diagram of a circuit connection of a first electronic device according to an embodiment of this application. As shown in FIG. 17, the first electronic device 30 includes a processor 301, a charging management chip 302, a first battery 303, an embedded controller 304, a first PD chip 306, and a first USB port 307. For a connection relationship of the first electronic device 30, refer to the connection relationship of the first electronic device 30 shown in FIG. 3.

In addition, the first electronic device 30 further includes a display screen 310, a sensor 311, a read-only memory (read only memory. ROM) chip 312, and the like. The processor 301 is separately connected to the display screen 310, the sensor 311, and the ROM chip 312.

Figure 18:
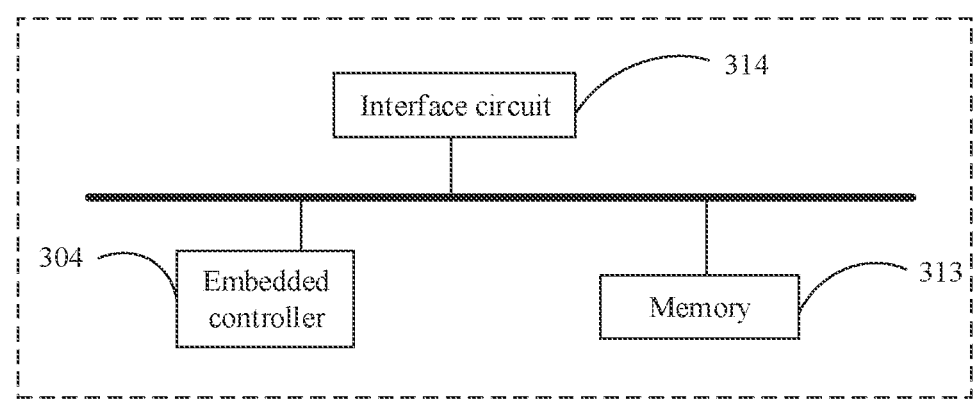
FIG. 18 is a schematic diagram of a hardware structure of a first electronic device according to an embodiment of this application.

A person skilled in the art may understand that the method and the apparatus may be mutually combined and referenced. The first electronic device provided in this embodiment of this application can perform the steps in the foregoing charging control method. FIG. 18 is a schematic diagram of a hardware structure of a first electronic device according to an embodiment of this application.

Referring to FIG. 18, the first electronic device 30 includes an embedded controller 304, a memory 313, and an interface circuit 314. The memory 313, the embedded controller 304, and the interface circuit 314 may communicate with each other. For example, the memory 313, the embedded controller 304, and the interface circuit 314 may communicate with each other by using a communication bus.

The memory 313 may be a read-only memory, a static storage device, a dynamic storage device, or a random access memory (random access memory, RAM). The memory 313 may store a computer program, the embedded controller 304 controls execution of the computer program, and the interface circuit 314 performs communication, to implement the charging control method provided in the foregoing embodiments of this application.

In a possible implementation, computer-executable instructions in this embodiment of this application may also be referred to as application program code. This is not specifically limited in this embodiment of this application. Optionally, the interface circuit 314 may further include a transmitter and/or a receiver.

An embodiment of this application further provides a computer-readable storage medium. The method described in the foregoing embodiments may be completely or partially implemented by using software, hardware, firmware, or any combination thereof. If implemented in software, the functions may be stored in a computer-readable medium or transmitted on a computer-readable medium as one or more instructions or code. The computer-readable medium may include a computer storage medium and a communication medium, and may further include any medium that enables a computer program to be transmitted from one place to another place. The storage medium may be any target medium accessible by a computer.

In a possible implementation, the computer-readable medium may include a RAM, a ROM, a compact disc read-only memory (compact disc read-only memory, CD-ROM) or another optical disk memory, a magnetic disk memory or another magnetic storage device, or any other medium that is to carry or store required program code in a form of an instruction or a data structure, and may be accessed by a computer. In addition, any connection is appropriately referred to as a computer-readable medium. For example, if software is transmitted from a website, a server, or another remote source by using a coaxial cable, an optical fiber cable, a twisted pair, a digital subscriber line (digital subscriber line, DSL), or wireless technologies (such as infrared, radio, and microwave), the coaxial cable, the optical fiber cable, the twisted pair, the DSL, or the wireless technologies such as infrared, radio, and microwave are included in the definition of the medium. As used herein, a magnetic disk and an optical disk include a compact disc, a laser disc, an optical disc, a digital versatile disc (digital versatile disc. DVD), a floppy disk, and a Blu-ray disc. The magnetic disk usually reproduces data in a magnetic manner, and the optical disk reproduces data optically by using a laser. A combination of the foregoing should also be included in the scope of the computer-readable medium.

The embodiments of this application are described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided to a general-purpose computer, a special-purpose computer, an embedded processor, or a processing unit of another programmable data processing device to generate a machine, so that the instructions executed by the computer or the processing unit of the another programmable data processing device generate an apparatus for implementing a specific function in one or more procedures in the flowcharts and/or in one or more blocks in the block diagrams.

The objectives, technical solutions, and beneficial effects of this application are further described in detail in the foregoing specific implementations. It should be understood that the foregoing descriptions are merely specific implementations of this application, but are not intended to limit the protection scope of this application. Any modification, equivalent replacement, or improvement made based on the technical solutions in this application shall fall within the protection scope of this application.

What is claimed is:

1. A method, comprising:
controlling an embedded controller to be powered off based on a first electronic device being powered off;
powering on, by the first electronic device when the first electronic device and the embedded controller are in a powered-off state and a first Universal Serial Bus (USB) port of the first electronic device is connected to a second USB port of a second electronic device, the embedded controller based on a first power supply signal that is received from the second electronic device at the first USB port;
obtaining, by the first electronic device, device information of the second electronic device when the embedded controller is powered on; and
charging, by the first electronic device, the second electronic device with a first battery based on the device information.

2. The method of claim 1, wherein charging the second electronic device based on the device information comprises charging the second electronic device with the first battery when a device type of the second electronic device is a to-be-charged device, wherein the device information comprises a power supply voltage and/or a power supply current.

3. The method of claim 2, wherein the device information comprises the power supply current and the power supply voltage, and wherein the device type of the second electronic device is based on a power supply power that is a product of the power supply current and the power supply voltage.

4. The method of claim 3, wherein the device type of the second electronic device is a to-be-charged device when the power supply power is less than or equal to a preset power, and the device type of the second electronic device is a power supply device when the power supply power is greater than the preset power.

5. The method of claim 2, wherein the device information comprises the power supply voltage, and wherein the device type of the second electronic device is a to-be-charged device when the power supply voltage is less than or equal to a preset voltage, and the device type of the second electronic device is a power supply device when the power supply voltage is greater than the preset voltage.

6. The method of claim 2, wherein the device information comprises the power supply current, and wherein the device type of the second electronic device is a to-be-charged device when the power supply current is less than or equal to a preset current, and the device type of the second electronic device is a power supply device when the power supply current is greater than the preset current.

7. The method of claim 2, wherein charging the second electronic device with the first battery when the device type of the second electronic device is a to-be-charged device comprises charging the second electronic device with the first battery when a first power value of the first battery meets a preset condition that the first power value is greater than a preset power value.

8. The method of claim 7, wherein after obtaining the first power value of the first battery, the method further comprises controlling, by the embedded controller, a power supply path between the first USB port and the second USB port to be disconnected when the first power value does not meet the preset condition.

9. The method of claim 7, wherein after charging the second electronic device with the first battery, the method further comprises:
regularly obtaining, by the embedded controller, a third power value of the first battery while the first battery charges the second electronic device; and
controlling, by the embedded controller, the first battery to stop charging the second electronic device when the third power value does not meet the preset condition.

10. The method of claim 1, wherein the first electronic device further comprises a first power delivery (PD) chip connected between the first USB port and the embedded controller, and a charging management chip connected between the first USB port and the first battery, wherein charging the second electronic device with the first battery based on the device information comprises sending, by the embedded controller, power supply role switching signaling to the first PD chip based on the device information, wherein the first PD chip switches a power supply role of the first electronic device from a powered device to a power supply device based on the power supply role switching signaling, and wherein when the power supply role of the first electronic device is switched from a powered device to a power supply device, a charging path formed by the first battery, the charging management chip, and the first USB port conducts electricity.

11. The method of claim 10, wherein after obtaining device information of the second electronic device, the method further comprises continuing to control the first PD chip to set the power supply role of the first electronic device to a powered device when a device type of the second electronic device is a power supply device, so that a power supply signal from the second electronic device is input to the first battery through the first USB port and the charging management chip.

12. The method of claim 1, wherein the first electronic device further comprises a first power delivery (PD) chip connected between the first USB port and the embedded controller, and a charging management chip connected between the first USB port and the first battery, wherein the charging management chip is further connected to the embedded controller, and wherein charging the second electronic device with the first battery based on the device information comprises:
sending, by the embedded controller, power supply role switching signaling to the first PD chip based on the device information;
receiving, by the embedded controller, a power supply role switching message from the first PD chip based on the power supply role switching signaling; and
sending, by the embedded controller when the power supply role switching message is that a power supply role of the first electronic device is switched from a powered device to a power supply device, a control instruction to the charging management chip to cause the charging management chip to transmit a power supply signal provided by the first battery to the first USB port.

13. The method of claim 1, wherein the first electronic device further comprises a first power delivery (PD) chip connected between the first USB port and the embedded controller, a charging management chip separately connected to the first USB port and a switch module, wherein the switch module is further connected to the first battery and the embedded controller, and wherein charging the second electronic device based on the device information comprises:
sending, by the embedded controller, power supply role switching signaling to the first PD chip based on the device information;
receiving, by the embedded controller, a power supply role switching message from the first PD chip based on the power supply role switching signaling; and
controlling, by the embedded controller, the switch module to be turned on when the power supply role switching message is that a power supply role of the first electronic device is switched from a powered device to a power supply device, to cause a charging path formed by the first battery, the charging management chip, and the first USB port to conduct electricity.

14. The method of claim 1, wherein the first electronic device further comprises a charging management chip separately connected to the first USB port and the embedded controller and wherein powering on the embedded controller based on the first power supply signal comprises:
powering on the charging management chip based on the first power supply signal received from the second electronic device at the first USB port; and
powering on the embedded controller based on a wake-up signal received by the embedded controller from the charging management chip, wherein the wake-up signal is generated after the charging management chip is woken up by a second power supply signal.

15. The method of claim 14, wherein the first electronic device further comprises a voltage conversion module connected between the first USB port and the charging management chip, wherein the second power supply signal is received from the voltage conversion module, and wherein the second power supply signal is generated after the voltage conversion module performs voltage conversion on the first power supply signal.

16. The method of claim 14, wherein the wake-up signal is received from the first USB port, wherein the wake-up signal is the first power supply signal provided by the second electronic device to the first USB port.

17. A first electronic device, comprising:
a first Universal Serial Bus (USB) port;
a first battery;
an embedded controller; and
a memory coupled to the embedded controller, wherein the memory is configured to store computer-executable instructions that, when executed by the embedded controller, cause the first electronic device to be configured to:
control the embedded controller to be powered off based on the first electronic device being powered off;
power on, when the first electronic device and the embedded controller are in a powered-off state and the first USB port is connected to a second USB port of a second electronic device, the embedded controller based on a first power supply signal received from the second electronic device at the first USB port;
obtain device information of the second electronic device when the embedded controller is powered on; and
charge the second electronic device with the first battery based on the device information.

18. The first electronic device of claim 17, wherein charging the second electronic device based on the device information comprises charging the second electronic device with the first battery when a device type of the second electronic device is a to-be-charged device, and wherein the device information comprises a power supply voltage and/or a power supply current.

19. The first electronic device of claim 18, wherein the device information comprises the power supply current and the power supply voltage, and wherein the device type of the second electronic device is based on a power supply power that is a product of the power supply current and the power supply voltage.

20. A non-transitory computer-readable storage medium storing instructions that, when executed by an embedded controller of a first electronic device, cause the first electronic device to be configured to:
control the embedded controller to be powered off based on the first electronic device being powered off;
power on, when the first electronic device and the embedded controller are in a powered-off state and a first Universal Serial Bus (USB) port of the first electronic device is connected to a second USB port of a second electronic device, the embedded controller based on a first power supply signal that is received from the second electronic device at the first USB port;
obtain device information of the second electronic device when the embedded controller is powered on; and charge the second electronic device with a first battery based on the device information.

\* \* \* \* \*